United States Patent
Pak et al.

(10) Patent No.: US 10,673,780 B2
(45) Date of Patent: Jun. 2, 2020

(54) COMPUTING DEVICES USING EXTREMELY HIGH FREQUENCY (EHF) ELECTROMAGNETIC COMMUNICATION

(71) Applicant: Keyssa Systems, Inc., Campbell, CA (US)

(72) Inventors: Edward T. Pak, Saratoga, CA (US); Roger Dwain Isaac, San Jose, CA (US)

(73) Assignee: Keyssa Systems, Inc., Campbell, CA (US)

( * ) Notice: Subject to any disclaimer, the term of this patent is extended or adjusted under 35 U.S.C. 154(b) by 0 days.

(21) Appl. No.: 15/838,238

(22) Filed: Dec. 11, 2017

(65) Prior Publication Data

US 2019/0182179 A1    Jun. 13, 2019

(51) Int. Cl.
| | |
|---|---|
| *H04L 12/933* | (2013.01) |
| *H04B 5/00* | (2006.01) |
| *H04L 12/931* | (2013.01) |
| *H04W 84/10* | (2009.01) |
| *H04W 88/08* | (2009.01) |

(52) U.S. Cl.
CPC ............ *H04L 49/10* (2013.01); *H04B 5/0031* (2013.01); *H04L 49/358* (2013.01); *H04W 84/10* (2013.01); *H04W 88/08* (2013.01)

(58) Field of Classification Search
CPC .. H01L 2224/73265; H01L 2924/3025; H04B 5/0031; H04B 1/40; H05K 1/0243; H04L 49/10

See application file for complete search history.

(56) References Cited

U.S. PATENT DOCUMENTS

| | | | |
|---|---|---|---|
| 8,554,136 B2 | 10/2013 | McCormack | |
| 8,714,459 B2 | 5/2014 | McCormack et al. | |
| 8,909,135 B2 | 12/2014 | McCormack et al. | |
| 2013/0070817 A1* | 3/2013 | McCormack | H04B 1/18 375/219 |
| 2014/0169486 A1* | 6/2014 | McCormack | G09G 3/2096 375/259 |
| 2014/0286643 A1* | 9/2014 | George | H04B 10/25759 398/115 |
| 2015/0288410 A1* | 10/2015 | Adiletta | H04B 1/40 455/73 |
| 2016/0189174 A1* | 6/2016 | Heath | G06Q 30/0201 705/7.29 |
| 2019/0067780 A1* | 2/2019 | Kirino | H01P 5/107 |

* cited by examiner

*Primary Examiner* — Shukri Taha
(74) *Attorney, Agent, or Firm* — Fenwick & West LLP

(57) ABSTRACT

A system, such as a server rack, includes rack mountable devices that communicate using one or more extremely high frequency (EHF) communication devices. A rack mountable device includes a rack mountable chassis including multiple sides, and a circuit board along a side of the rack mountable chassis, the circuit board having a surface. The EHF communication devices are positioned along the side of the rack mountable chassis and attached to the surface of the circuit board. Each of the EHF communication devices is configured to convert between an EHF electromagnetic signal and an electrical data signal. The EHF communication devices form EHF communication channels with other EHF communication devices in other rack mountable devices, or in the server rack to provide high bandwidth data transfer utilizing space on the sides of the rack mountable device.

20 Claims, 20 Drawing Sheets

COMPUTING DEVICES USING EXTREMELY HIGH FREQUENCY (EHF) ELECTROMAGNETIC COMMUNICATION

BACKGROUND

An issue that is known to plague data centers is cabling. For example, the term "spaghetti cabling" is used to refer to the unkempt cabling mess that is often found springing out from the back panels of server racks at a data center. Spaghetti cabling may result from inexperience, lack of foresight, or laziness of the ones responsible for setting up the servers, and generally leads to poor cooling from impeded air flow and to maintenance nightmares. Although spaghetti cabling may be prevented, or at least mitigated, by shortening, bundling, and labeling the cables, the use of cables itself may be a limiting factor in the scalability of a server rack.

For example, a cable port to which a cable connects generally has dimensions that conform to a widely-used standard and thus cannot be easily changed. Due to the inflexible dimensions of the cable ports and the limited amount of space on a server rack back panel, a limited number of cable ports can be physically implemented on the server rack back panel. This means that, even though the bandwidth of the server rack can be increased by increasing the number of cable ports, a port density issue may arise in which the amount of increase in the bandwidth would still be constrained by the limited number of cable ports that can be physically implemented.

SUMMARY

A system includes components that use extremely high frequency (EHF) communication devices to form EHF electromagnetic communication channels for data transfer. The system may include a server rack including one or more rack mountable devices. A rack mountable device includes a rack mountable chassis having multiple sides, a circuit board having a surface that extends along a side of the rack mountable chassis, and one or more EHF communication devices attached to the surface of circuit board. Each EHF communication device converts between an EHF electromagnetic signal and an electrical data signal.

The system may include a rack frame including multiple bays. Rack mountable devices are inserted into the bays. The EHF communication devices of each rack mountable device may be located along top and bottom surfaces of the rack mountable device to form EHF electromagnetic communication channels with other EHF communication devices of other rack mountable devices in the rack frame. The rack mountable devices may include servers, with the EHF communication devices providing server-to-server communications. In another example, an EHF communication device may be located along a side surface of the rack mountable device to form an EHF electromagnetic communication channel with another EHF communication device located along a side of the rack mountable chassis, such as to provide server-to-rack communications.

In some embodiments, a rack mountable device uses an EHF communication device to communicate management data via an EHF electromagnetic signal. The management data may include an identifier of the rack mountable device and state information regarding components of the rack mountable device.

In some embodiments, a rack mountable device uses EHF communication devices to communicate between a main board and a data storage drive in the rack mountable device. For example, the main board may include a processor that accesses data from a memory device of the data storage drive using one or more EHF electromagnetic communication channels formed by EHF communication devices on the main board and the data storage drive. The data storage drive may include traditional mechanical disks (HDD), non-volatile memory (FLASH/SSD/NVMe) and non-volatile main memory such as persistent DRAMs (NVDIMM-P).

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

In accordance with some embodiments disclosed herein, extremely high frequency (EHF) communication devices that convert between EHF electromagnetic signals and electrical data signals may replace or reduce the use of cables for establishing communication links in or between components of server rack systems, thereby overcoming or reducing cabling issues such as those discussed above. A server rack system may include one or more rack mountable devices, each of which may be a server. For the purpose of describing particular embodiments and convenience, the term "rack mountable device" is herein used interchangeably with the term "server." However, a rack mountable device is not limited to a server and may include any device. As an example, a server may include a chassis and one or more EHF communication devices along one or more surfaces of the chassis. The server may include a computing device, a storage device, a switching device, a communication device, etc. and may be configured to mount in a server rack. Each EHF communication device may form an EHF communication channel with another EHF communication device, which may be disposed in an adjacent server in the server rack or in a bay of the server rack, to provide high bandwidth data transfer for the server.

Server Rack

Figure 1:
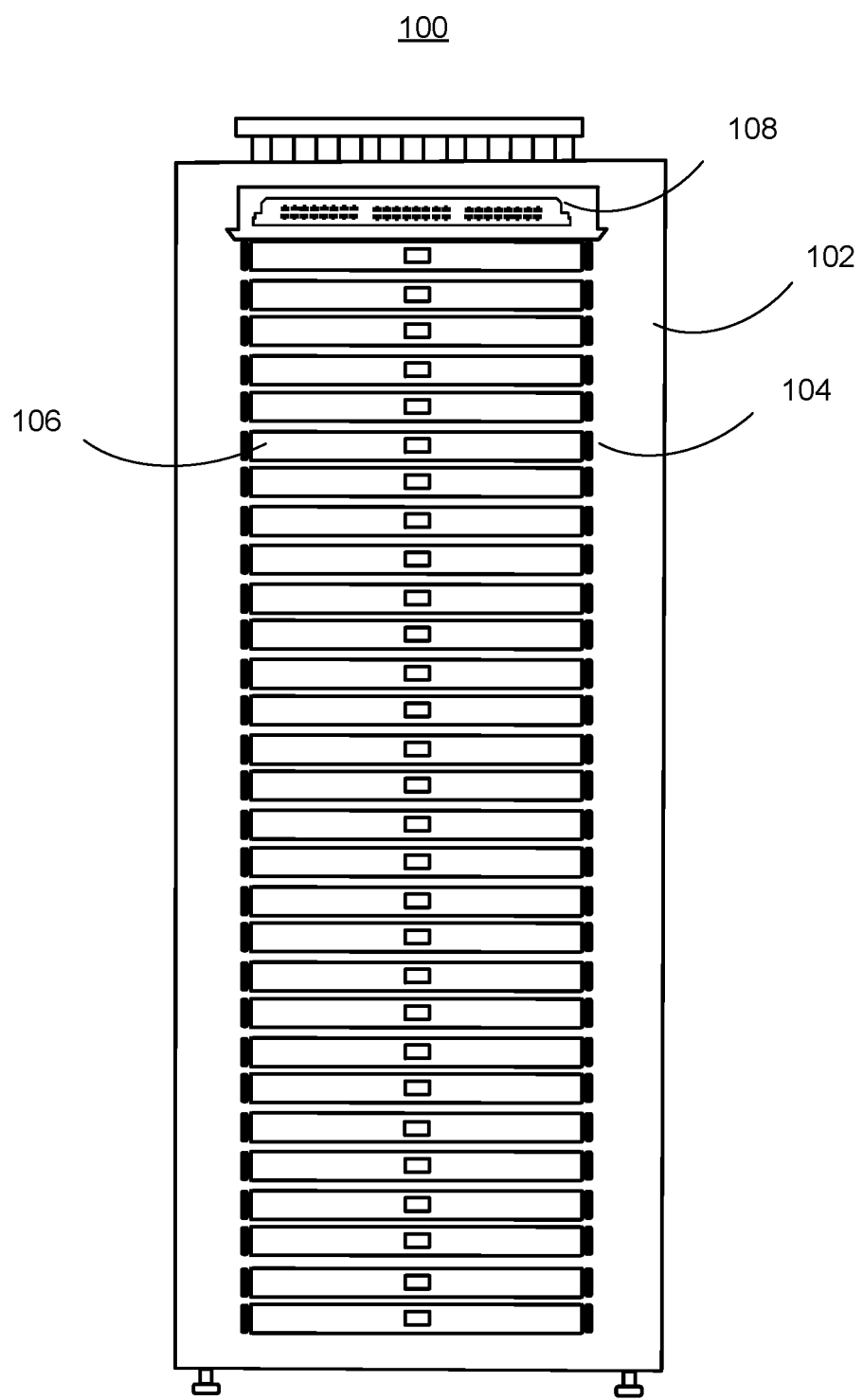
FIG. 1 shows a server rack, in accordance with some embodiments.

FIG. 1 shows a server rack 100, in accordance with some embodiments. The server rack 100 includes a rack frame 102 defining an array of bays 104. A server 106 may be configured to insert into each of the bays 104. The server rack 100 may provide power, data communication, and cooling to each of the servers 106 in the server rack 100. Each server 106 may include a rack mountable chassis with EHF communication devices on the chassis. For example, EHF communication devices may be located at the top and bottom surfaces of the servers 106 to provide server-to-server wireless communications, and EHF communication devices may be located on side surfaces of the servers 106 to provide server-to-rack wireless communications. Examples of servers 106 include 1 U, 2 U and 4 U servers, networking equipment, and/or storage devices.

The server rack 100 further includes one or more rack switches 108, such as a top-of-rack (TOR) switch. A rack switch 108 may provide networking capability to the servers 106, as well as other components. In such case, a server 106 may communicate with other networked devices outside of the server rack 100 via the rack switch 108. Servers 106 in the server rack 100 may also communicate with each other via the rack switch 108. The servers 106 may communicate with the rack switch 108 using EHF communication devices. For example, EHF communication devices of a server 106 may communicate with EHF communication devices of the server rack 100 via electromagnetic signals, while the EHF communication devices in the server rack 100 may be electrically connected to the rack switch 108, thereby bridging communication between the servers 106 and the rack switch 108.

Figure 2:
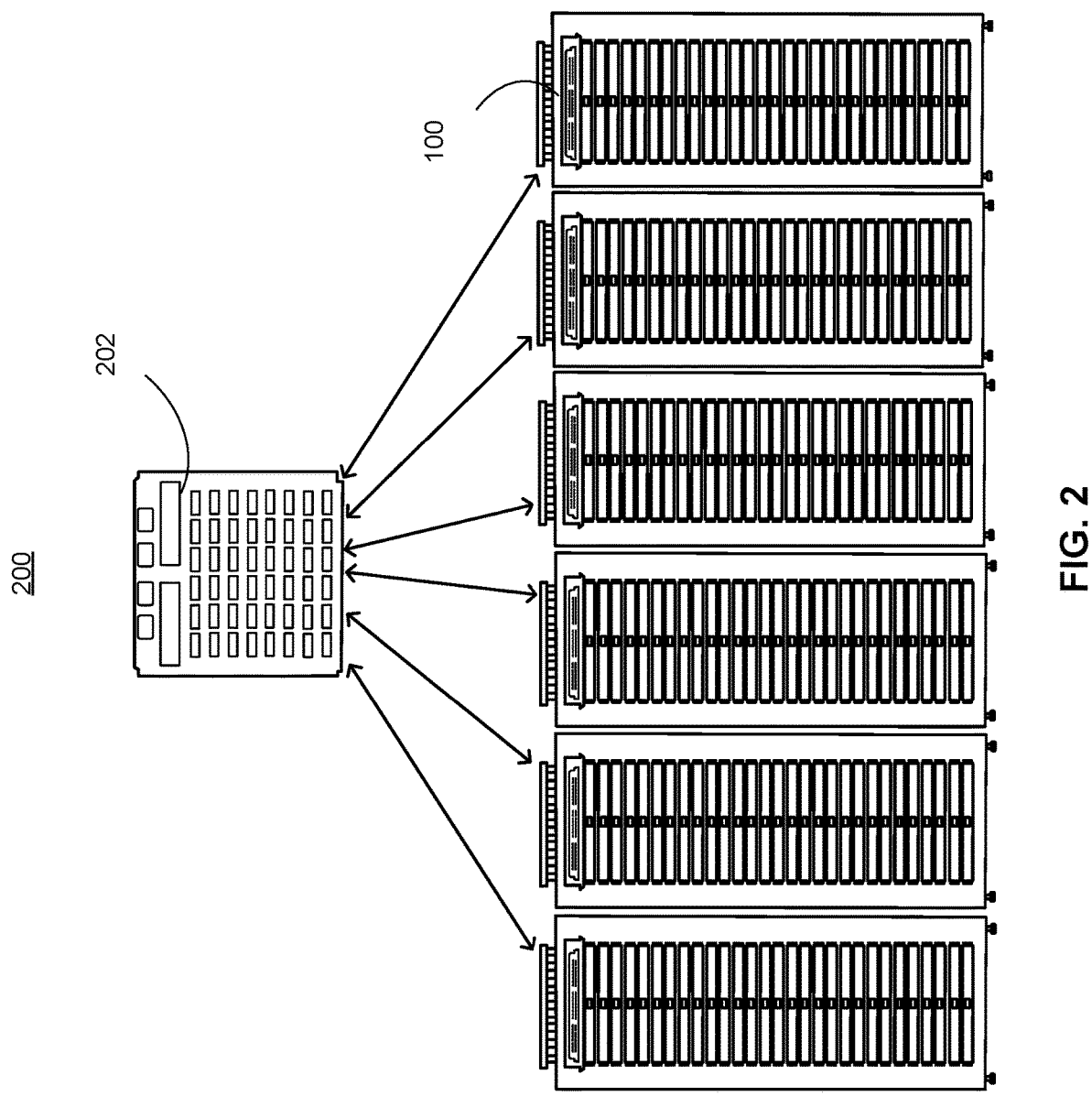
FIG. 2 shows a server rack system, in accordance with some embodiments.

FIG. 2 shows a server rack system 200, in accordance with some embodiments. The system 200 includes multiple server racks 100 connected via a spine router 202. The spine router 202 may include switches that provide network connection points for servers in the servers 106 of the server racks 100. The spine router 202 connects with the rack switches 108 (e.g., TOR switches) in the server racks 100 and provides a spine and leaf layer topology for the system 200. In other embodiments, server racks 100 may be connected using other types of network topologies.

Server-to-Server EHF Communications

Figure 3:
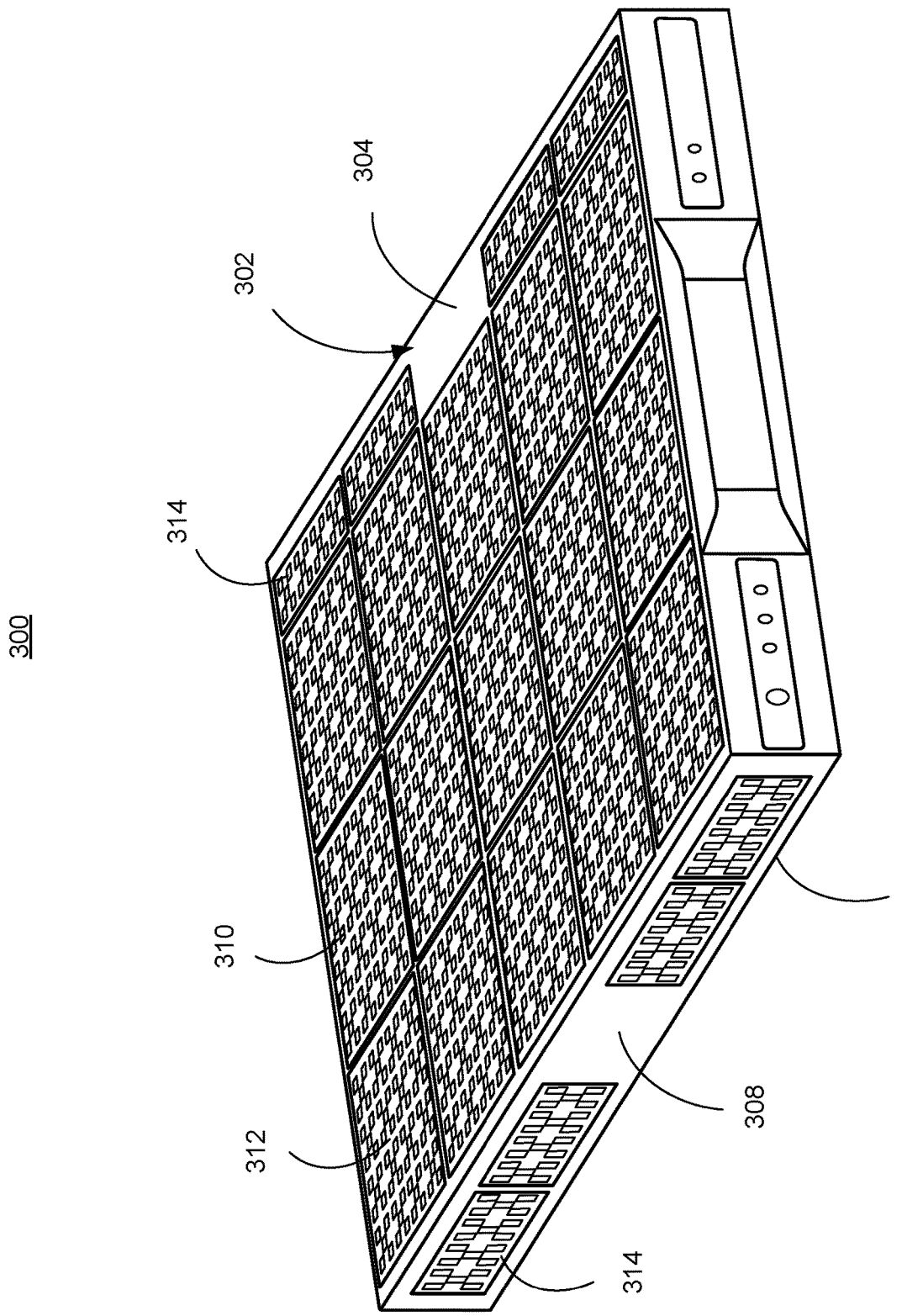
FIG. 3 shows a rack mountable device for a server rack, in accordance with some embodiments.

FIG. 3 shows a server 300 for a server rack 100, in accordance with some embodiments. The server 300 is an example of a server 106 configured to insert into the bays 104 of the server rack 100. The server 300 includes a chassis 302 enclosing computing components. The chassis 302 is a rack mountable chassis having a rectangular cuboid shape with three pairs of opposing sides. The chassis 302 includes a top cover panel 304, a bottom cover panel 306, left and right cover panels 308, a front cover panel, and a rear cover panel. The chassis 302 may also be referred to as a case.

One or more of the cover panels 304, 306, and 308 may include EHF communication devices 310 that provide wireless communications with EHF communication devices of other servers 300 in the server rack 100, or with other EHF communication devices in the server rack 100. Each EHF communication device 310 converts between an EHF electromagnetic signal and an electrical data signal. The EHF electromagnetic signal includes electromagnetic radiation in an EHF frequency range. In other embodiments, the communication devices 310 may transmit or receive electromagnetic signals in other radio frequency ranges.

When the server 300 is mounted in a bay 104 adjacent to other servers 300, the EHF communication devices 310 in the top cover panel 304 may form EHF electromagnetic communication channels with an above-adjacent server 300 using EHF electromagnetic signals, and the EHF communication devices 310 in the bottom cover panel 306 may form EHF electromagnetic communication channels with a below-adjacent server 300 using EHF electromagnetic signals. In another example discussed in greater detail in connection with FIG. 14, the EHF communication devices 310 may be located in the left and/or right side cover panels 308 to form EHF electromagnetic communication channels with EHF communication devices in the server rack 100. More particularly, the server 300 may include EHF communication devices 310 in the left and right side cover panels 308 to communicate with EHF communication devices at the sides of the rack frame 102. In other embodiments, the back or front side cover panels of the server 300 may include EHF communication devices.

In some embodiments, the EHF communication devices 310 in the top cover panel 304 and/or the bottom cover panel 306 are formed on coupler tiles 312. Each coupler tile 312 includes multiple EHF communication devices 310 on a printed circuit board (PCB). Multiple coupler tiles 312 may be arranged in a cover panel along a side of the chassis 302 to support differently sized chassis 302. The EHF communication devices 310 in the left and right cover panels 308, defined between the opposite top cover panel 304 and bottom cover panel 306, may be part of coupler strips 314. Each coupler strip 314 includes multiple EHF communication devices 310 on a printed circuit board. The coupler strips 314 may have different dimensions (e.g., rectangular) than the coupler tiles 312 (e.g., square) to support mounting at narrower surfaces. Multiple coupler strips 314 may be arranged in the left and right cover panels 308.

The coupler tile 312 and coupler strip 314 show example circuit board dimensions that may be used to attach the EHF communication devices 310. Generally, the size or shape of coupler tiles 312 or coupler strips 314 may vary, such as based on the dimensions of the chassis 302. The EHF communication devices 310 may be mounted to circuit boards in various patterns or arrangements. In some embodiments, coupler strip 314 may be included in the top cover panel 304 or bottom cover panel 306 when space remains after placing the coupler tiles 312, as shown in FIG. 3.

Figure 4:
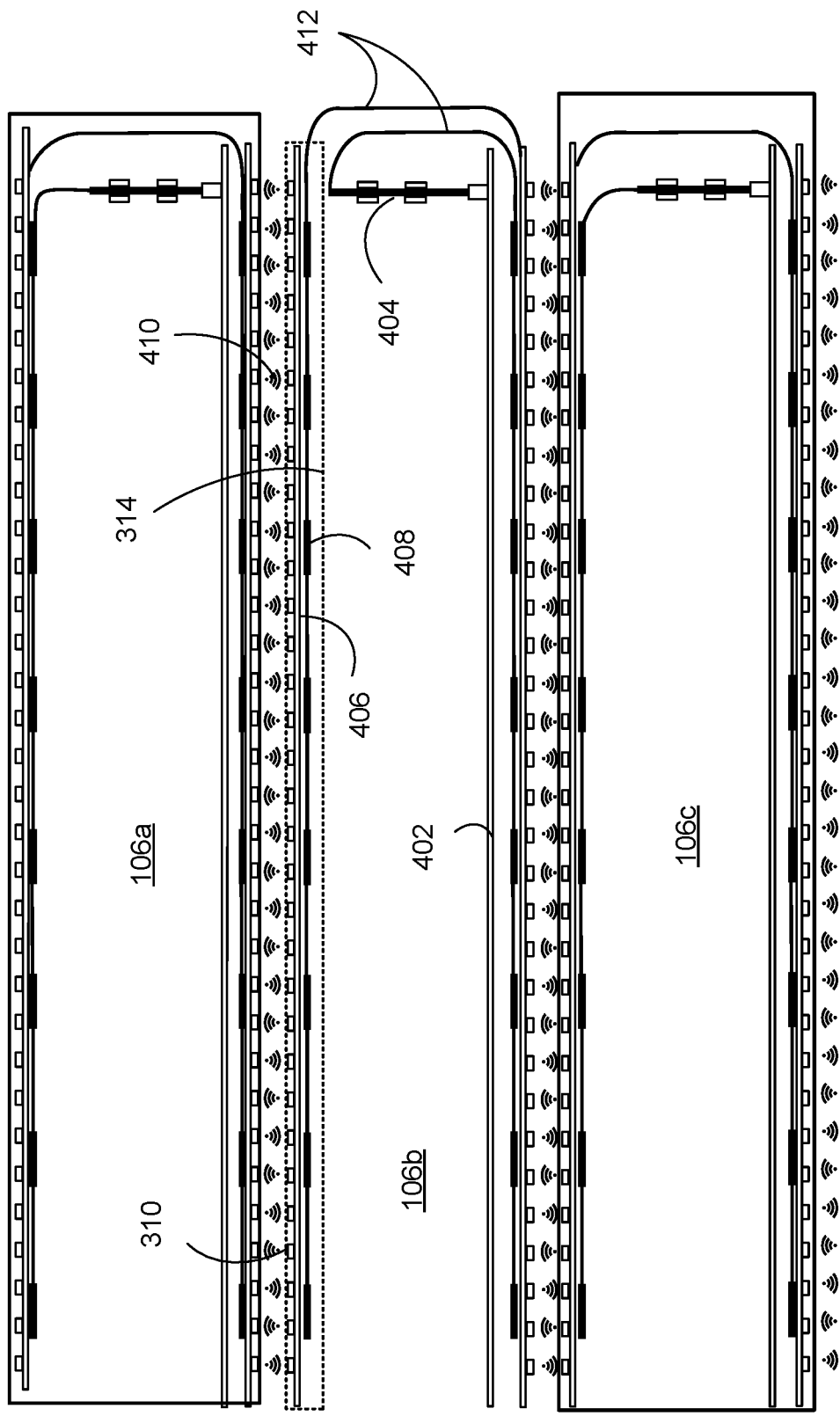
FIG. 4 shows a cross sectional side view of rack mountable devices in a server rack, in accordance with some embodiments.

FIG. 4 shows a cross sectional side view of servers 106 in a server rack 100, in accordance with some embodiments. The servers 106a, 106b, and 106c are vertically stacked on top of each other and include EHF communication devices 310 on their top and bottom cover panels to enable wirelessly communication with adjacent servers 106 via EHF electromagnetic communication channels 410 (or "EHF channels 410"). EHF electromagnetic signals are transmitted and received across the EHF electromagnetic communication channels 410 to transfer data between separate servers 106. For example, the server 106b has EHF communication devices 310 at the top cover panel to communicate with the server 106a above, and has EHF communication devices 310 at the bottom cover panel to communicate with the server 106c below. In other embodiments, multiple servers 106 may be stacked horizontally in a server rack 100.

Each EHF communication device 310 of a server 106 is paired with a corresponding EHF communication device 310 of an adjacent server 106 to send and receive EHF electromagnetic signals. Thus, EHF communication devices 310 on adjacent servers 106 are spaced apart with a common pitch and aligned with each other. The EHF electromagnetic signals provide near-field coupling between paired EHF communication devices 310, allowing the EHF communication devices 310 to be arranged in dense arrays without cross interference with nearby pairs of EHF communication devices 310.

With reference to the server 106b, each server may include a main board 402, a connector board 404, and coupler tiles 312. The main board 402 is a motherboard or other primary board of the server 106b, and may support other computing components such as processors, memories, etc. The connector board 404 is connected to the main board 402 to provide an interface to the EHF communication devices 310, and may be a riser board. The connector board 404 may be a PCI-express compatible board that plugs into a PCI-express connector of the main board 402. Each coupler tile 312 may include a connector to connect with the connector board 404 via a cable 412 that includes conductive wires so that data can be communicated between the coupler tile 312 and the connector board 404. In other embodiments, the coupler tile 312 may be connected to the connector board 404 and/or the main board 402 via a mezzanine connector rather than a cable. Coupler strips 314 may be similarly connected to the connector board 404 as shown in FIG. 4. For example, a cable or mezzanine connector may be used to connect a coupler strip 314 to the connector board 404 and/or the main board 402.

In some embodiments, each coupler tile 312 (or coupler strip 314) includes a circuit board 406, the EHF communication devices 310, and one or more data aggregator devices 408. The EHF communication devices 310 and the data aggregator devices 408 are located on and interconnected by the circuit board 406. Each aggregator device 408 performs routing of data to and from at least a subset of EHF communication devices 310 of the coupler tile 312.

For receiving data, the aggregator device 408 may receive electrical data signals from multiple EHF communication devices 310 (e.g., in parallel), combine lower data-rate data from the electrical data signals into higher data-rate data, and provide the higher data-rate data to the main board 402 via the connector board 404.

For transmitting data, the aggregator device 408 may receive outgoing data from the main board 402 (e.g., via the connector board 404 and the circuit board 406), and generate multiple electrical data signals from the outgoing data at lower data rates, and provide the electrical data signals to respective EHF communication device 310 for wireless transmission (e.g., in parallel). That is, the aggregator device may receive high data-rate electrical data signals and split them across multiple lower-speed EHF channels. In some embodiments, the aggregator device 408 may also aggregate EHF signals into a high data-rate set of electrical signals.

In addition to performing the aggregating and disaggregating/splitting functions, the aggregator device 408 may also perform additional functions, including: monitoring the link, encryption, decryption, forward error correction, cyclic redundancy code (CRC) generation, error checking, and passing through sideband information from low-speed electrical signals or from the on-board processing on the aggregator.

The aggregator device 408 may be on an opposite surface of the coupler tile 314 from the EHF communication devices 310, or may be on the same surface of the coupler tile 314 as the EHF communication devices 310. In some embodiments, the aggregator devices 408 control switching between transmission and reception states of EHF communication devices 310. In some embodiments, the connector board 404 includes the aggregator devices 408 of the server 106, and the aggregator devices may be omitted from the coupler tiles 312 or coupler strips 314.

Figure 5:
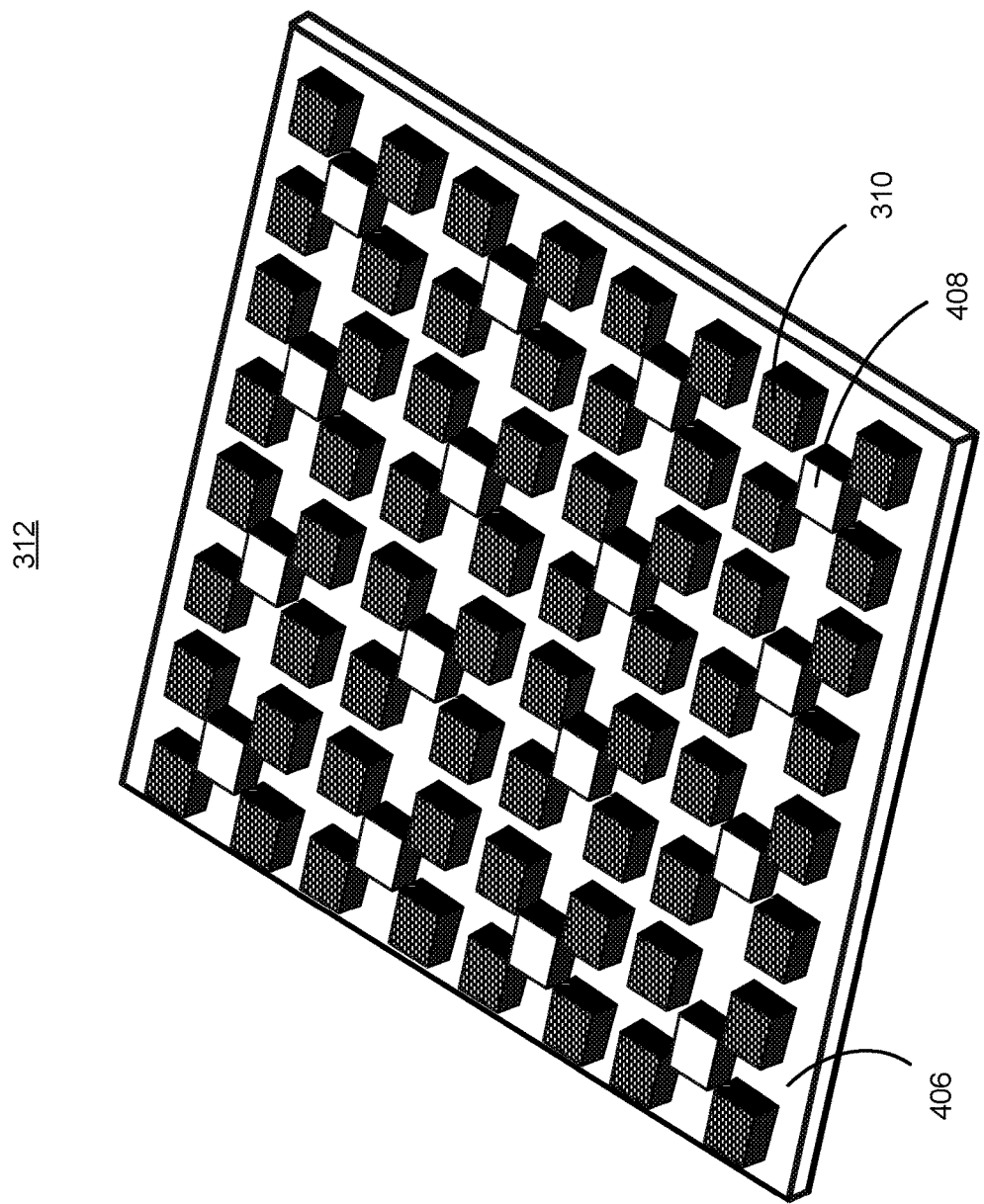
FIG. 5 shows a coupler tile of a rack mountable device, in accordance with some embodiments.

FIG. 5 shows a coupler tile 312 of a server 106, in accordance with some embodiments. The coupler tile 312 includes the circuit board 406, the EHF communication devices 310, and the aggregator devices 408. Each aggregator device 408 handles data routing, aggregation, and distribution for a group of four adjacent EHF communication devices 310. The circuit board 406 provides electrical interconnections between the aggregator devices 408 and the EHF communication devices 310. In this example, the EHF communication devices 310 and the aggregator devices 408 are formed on the same surface of the circuit board 406.

In some embodiments, the coupler tile 312 includes sixteen aggregator devices 408, each facilitating data aggregation for four EHF communication devices 310. The coupler tile 312 thus includes sixty-four EHF communication devices 310. Thirty-two of the EHF communication devices 310 are receiving devices that receive EHF electromagnetic signals, and thirty-two of the EHF communication devices 310 are transmitting devices that transmit EHF electromagnetic signals. If each of the EHF communication devices 310 has a data rate of 6 Gigabits/second (Gbps), then the coupler tile 312 can support a read data rate of greater than 128 Gbps and a write data rate of greater than 128 Gbps. In another example, if each of the EHF communication devices 310 has data rate of 12 Gbps, then the coupler tile 312 can support a read data rate of greater than 256 Gbps and a write data rate of greater than 256 Gbps. In another example, if each of the EHF communication devices 310 has data rate of 28 Gbps, then the coupler tile 312 can support a read data rate of greater than 512 Gbps and a write data rate of greater than 512 Gbps.

Figure 6A:
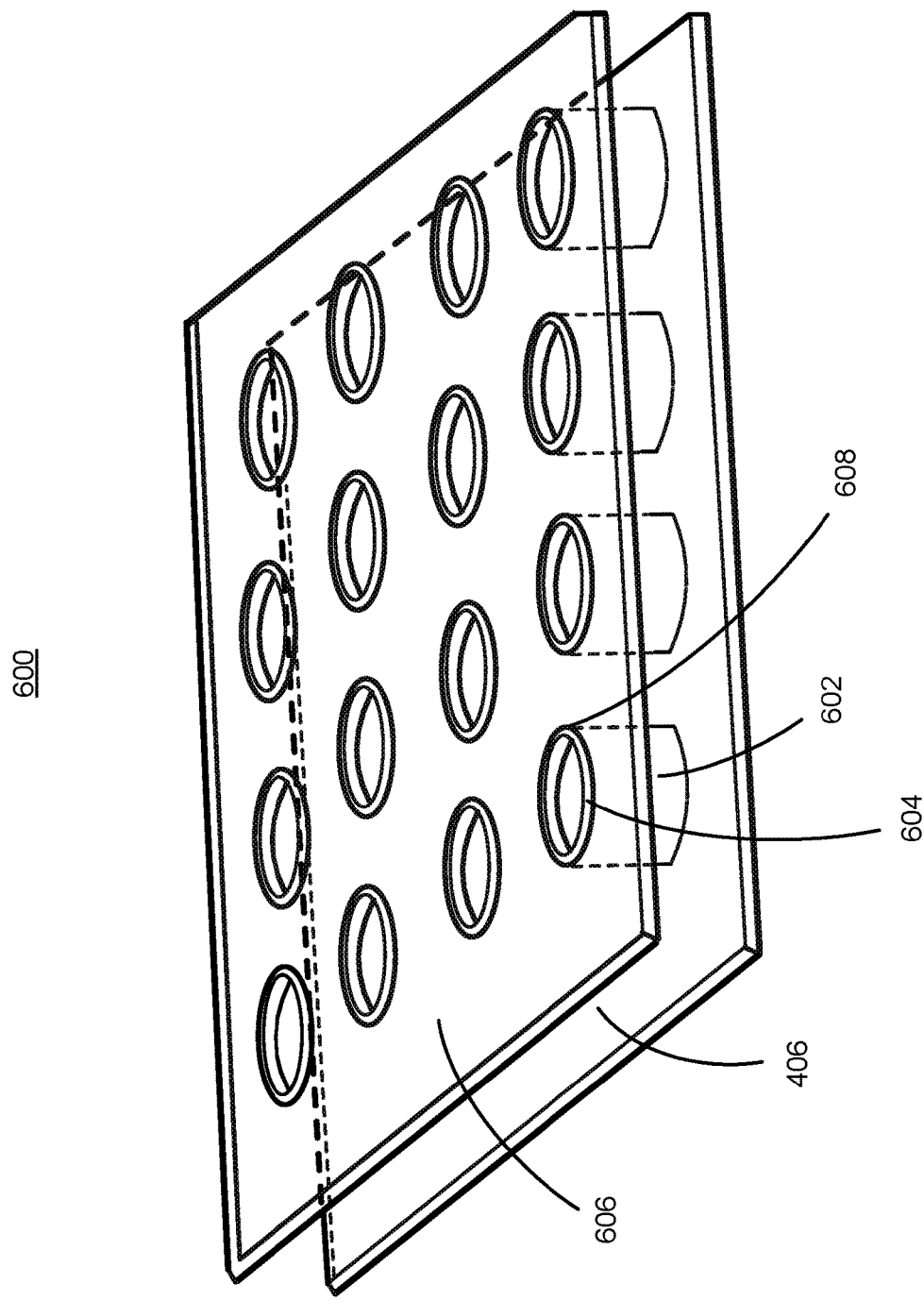
FIG. 6A shows a cover panel structure, in accordance with some embodiments.
Figure 6B:
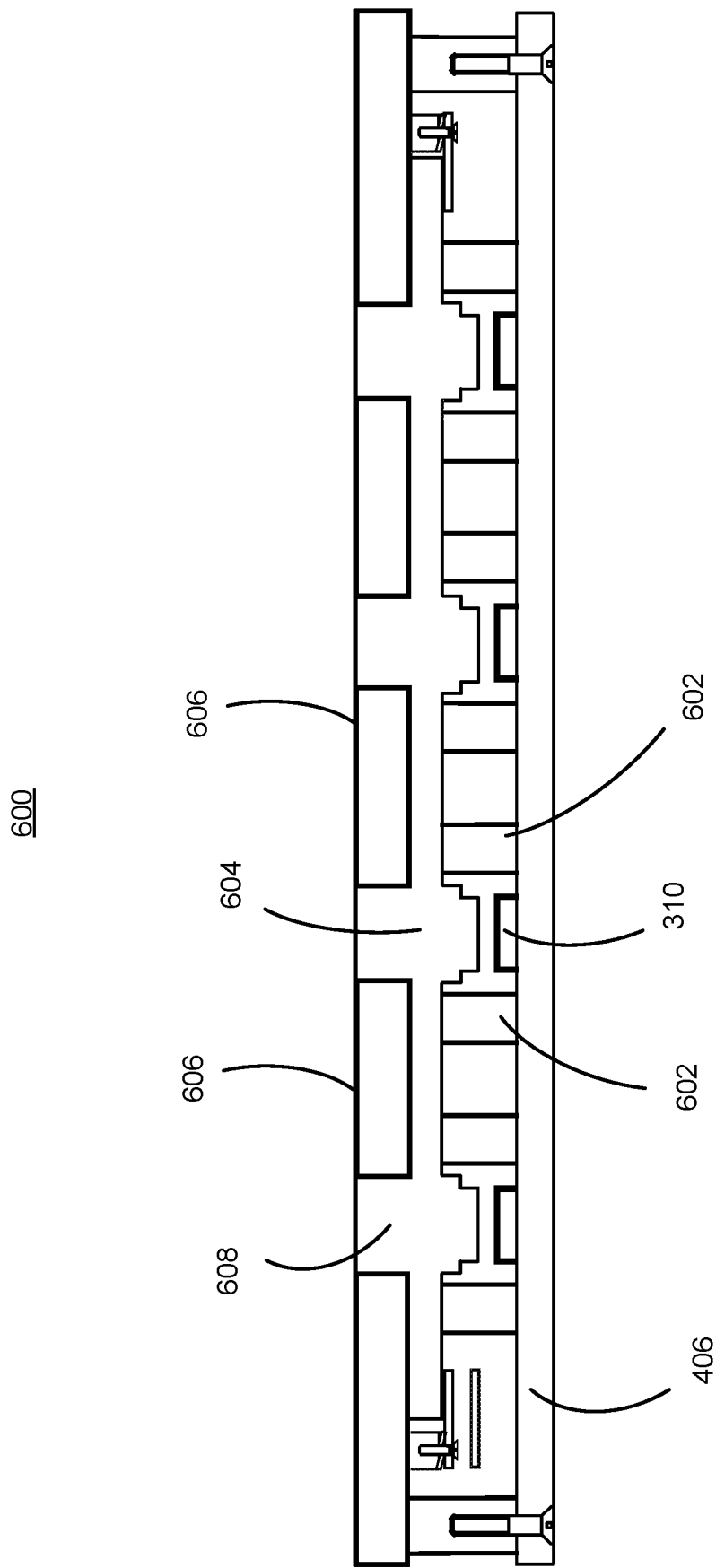
FIG. 6B shows a cross sectional side view of the cover panel structure of FIG. 6A, in accordance with some embodiments.

FIGS. 6A and 6B respectively show perspective and cross sectional views of a cover panel 600, in accordance with some embodiments. The cover panel 600 includes the circuit board 406, the EHF communication devices 310 (as shown in FIG. 6B), a cover 606, which may include a metal material, that provides structural protection for the EHF communication devices 310, radiation absorbing shields 602 that provide EHF electromagnetic signal isolation among nearby EHF communication devices 310 on the same circuit board 406, and waveguides 604 for guiding the EHF electromagnetic signals to facilitate coupling of paired EHF communication devices 310.

As shown in FIG. 6B, each EHF communication device 310 is surrounded by an EHF radiation absorbing shield 602 to shield the EHF communication device 310 from EHF electromagnetic signals of nearby or adjacent EHF communication devices 310 on the circuit board 406. Each EHF radiation absorbing shield 602 defines a cavity with an EHF communication device 310 located in the cavity. The EHF radiation absorbing shields 602 are shown as having a hollow cylindrical shape, but other shapes may also be used. In some embodiments, the radiation absorbing shield 602 includes a metallic material or other absorbing material (such as ferrite loaded silicone (or other dielectrics) or carbon loaded silicone (or other dielectrics)).

The waveguide 604 is a dielectric lens waveguide for the EHF signals emitted from and received by the EHF communication device 310. The waveguide 604 is positioned over the EHF communication device 310 and is partially surrounded by the EHF radiation absorbing shield 602. EHF electromagnetic signals emitted by the EHF communication device 310 is received by the waveguide 604, and is directed by the waveguide 604 through an opening 608 in the cover 606. The waveguide 604 provides a medium to propagate the EHF electromagnetic signal between the opening 608 and an EHF communication device 310. In some embodiments, the waveguide 604 is plastic, dielectric material having a dielectric constant of at least about 2. In some embodiments, the waveguides 604 are formed as a unitary lens structure that is shared across multiple EHF communication devices 310 and that includes protrusions extending through the openings 608 in the cover 606. In some embodiments, waveguides other than the waveguide 604 may be used.

The cover 606 is formed over the waveguide 604, and structurally protects the covered components. The cover 606 may include the openings 608 through which the waveguide 604 may extend to guide EHF electromagnetic signals from the EHF communication devices 310 through the openings 608. In some embodiments, the cover 606 is a metallic, conductive sheet. In other embodiments, a plastic or dielectric casing material is used instead of metal sheeting.

In some embodiments, aggregator devices 408 are also formed on the circuit board 406. The data aggregator devices 408 may be positioned on the surface of the circuit board 406 opposite the EHF communication devices 310, or on the same surface of the circuit board 406 as the EHF communication devices 310, such as in spaces defined between radiation absorbing shields 602 that surround the EHF communication devices 310. In some embodiments, the data aggregator devices 408 are omitted from the cover panel 600.

The discussion herein regarding the cover panel 600 that includes a coupler tile 312 may also be applicable to a cover panel that includes coupler strips 314. For example, the cover panel may also include a coupler strip 314, cover, lens, and radiation absorbing shields to support the EHF communication devices 310 of the coupler strip 314.

In one embodiment, the coupler tiles and coupler strips may be separate from and not integrated into the cover panel 600. When the coupler tiles and coupler strips are separate from the cover panel 600, the coupler tiles may still be located close to the cover panel 606 such that the coupler tiles and coupler strips are parallel to the cover panel 600 and the EHF communication devices 310 are aligned with the openings in the cover panel 606.

Figure 7A:
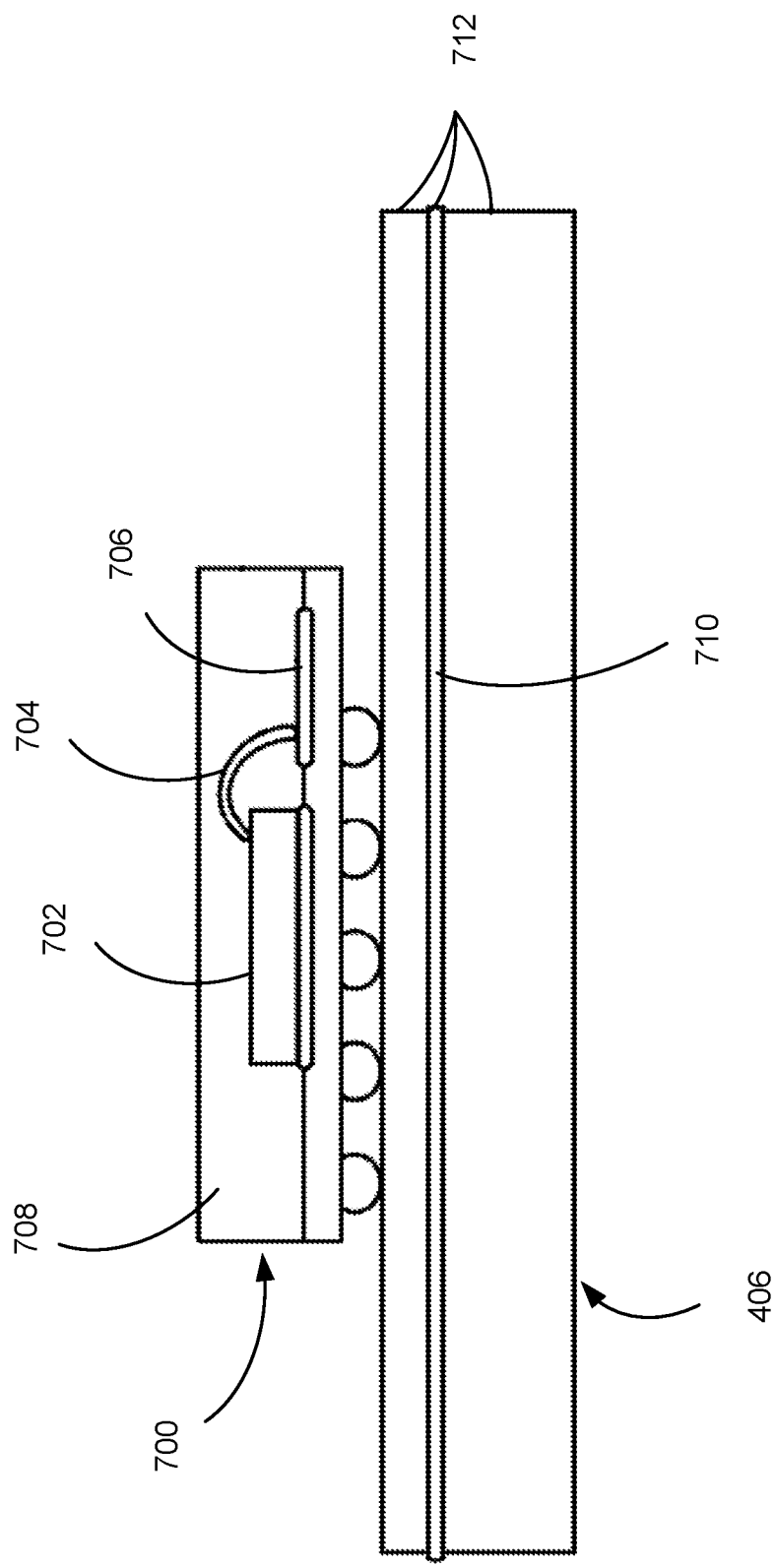
FIG. 7A shows an extremely high frequency (EHF) communication device, in accordance with some embodiments.
Figure 7B:
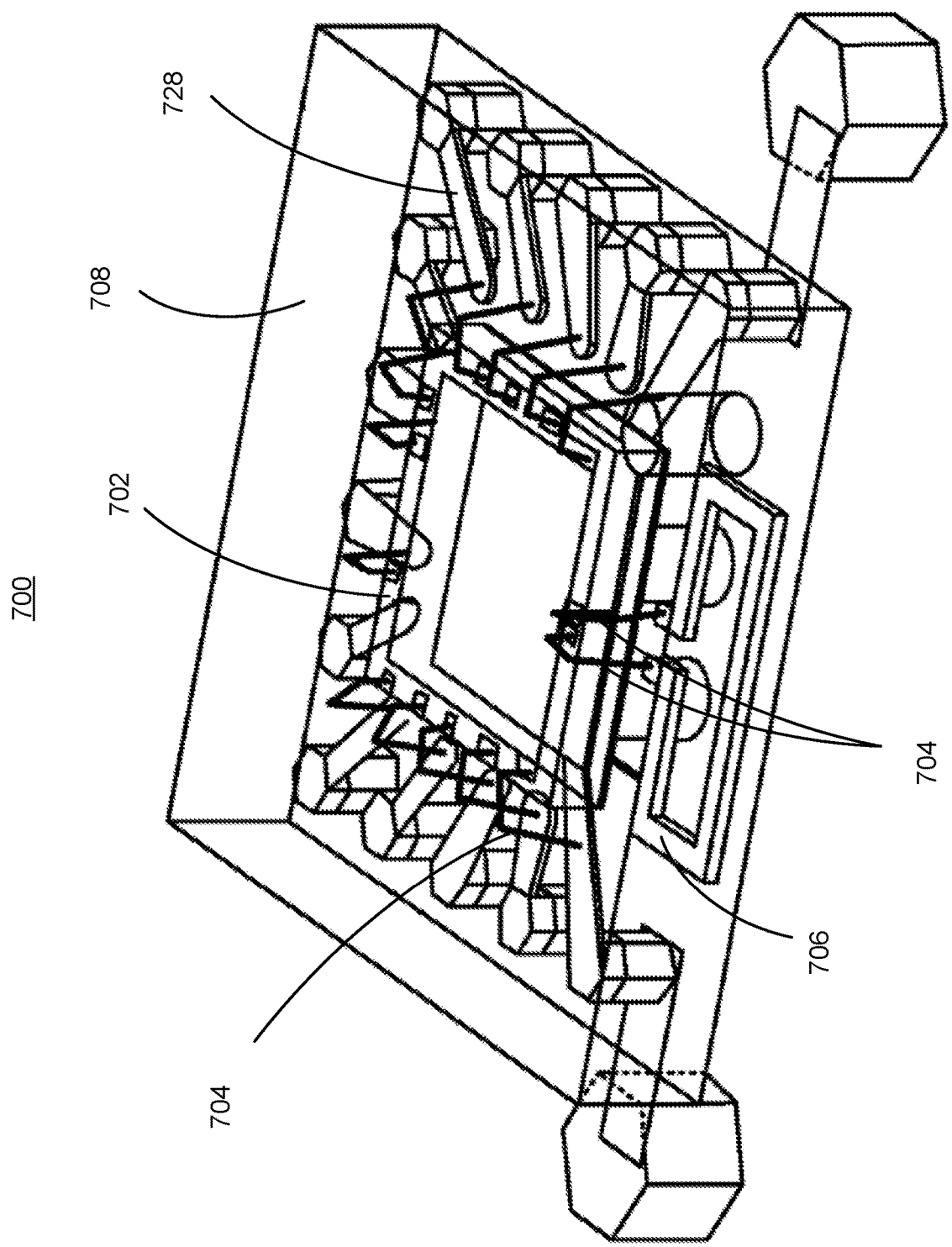
FIG. 7B shows a perspective view of the EHF communication device of FIG. 7A, in accordance with some embodiments.

FIG. 7A shows a side view of an extremely high frequency (EHF) communication device 700, in accordance with some embodiments. The EHF communication device 700 is an example of an EHF communication device 310 of a server 300. The EHF communication device 700 may be an integrated circuit (IC) package mounted on the circuit board 406. FIG. 7B shows a perspective view of the EHF communication device 700, in accordance with some embodiments. The EHF communication device 700 may include a die 702, a lead frame 728 (shown in FIG. 7B), one or more conductive connectors such as bond wires 704, a transducer such as antenna 706, and an encapsulating material 708. The die substrate may be formed using any suitable material, such as, but not limited to, FR4, a glass-reinforced epoxy composite material. The die 702 may be mounted in electrical communication with the lead frame 728. The lead frame 728 may be any suitable arrangement of electrically conductive leads that allow one or more other circuits to operatively connect with the die 702. The leads of the lead frame 728 may be embedded or fixed in a lead frame substrate. The lead frame substrate may be formed using any suitable insulating material configured to substantially hold the leads in a predetermined arrangement.

The electrical communication between the die 702 and other components may be accomplished by any suitable method using conductive connectors, such as one or more bond wires. The bond wires 704 (shown in FIG. 7B) may be used to electrically connect points on a circuit of the die 702 with corresponding leads on the lead frame 728. In another embodiment, the die 702 may be disposed in a flip chip configuration, in which case the die may be inverted, and the conductive connectors may be bumps or die solder balls, rather than bond wires 704.

The antenna 706 may be any suitable structure configured as a transducer to convert between electrical and electromagnetic signals. The antenna 706 may be configured to operate in an EHF spectrum (30 GHz to 300 GHz), and may be configured to transmit and/or receive electromagnetic signals. In some embodiments, the antenna 706 may be constructed as a part of the lead frame 728. In other embodiments, the antenna 706 may be separate from but operatively connected to the die 702 by any suitable method, and may be located adjacent to the die 702. For example, the antenna 706 may be connected to the die 702 using the bond wires 704. Alternatively, in a flip chip configuration, the antenna 706 may be connected to the die 702 without the use of the bond wires 704. In other embodiments, the antenna 706 may be disposed on the die 702 or on the circuit board 406.

The die 702 may include a transmitter circuit, a receiver circuit, or a transceiver circuit that is coupled to the antenna 706. The transmitter circuit receives an electrical data signal that includes outbound data and modulates an EHF carrier signal using the electrical data signal to generate an EHF electrical signal provided to the antenna 706. The receiver circuit receives an EHF electrical signal from the antenna 706 and demodulates the EHF electrical signal into an electrical data signal that includes inbound data. The transceiver circuit may perform the functions of both the transmitter and the receiver circuits.

The encapsulating material 708 may hold the various components of the EHF communication device 700 in fixed relative positions. The encapsulating material 708 may be any suitable material that provides electrical insulation and physical protection for the electrical and electronic components of the EHF communication device 700. For example, the encapsulating material 708 may be a mold compound, glass, plastic, or ceramic. The encapsulating material 708 may be formed in any suitable shape. For example, the encapsulating material 708 may be in the form of a rectangular block, encapsulating all components of the EHF communication device 700 except the unconnected leads of the lead frame. One or more external connections may be formed with other circuits or components. For example, external connections may include ball pads and/or external solder balls for connection to a printed circuit board.

The EHF communication device 700 may be mounted on the circuit board 406 as discussed above. The circuit board 406 may include one or more laminated layers 712, one of which may be a ground plane 710. The ground plane 710 may be any suitable structure configured to provide an electrical ground to circuits and components on the circuit board 406.

Figure 8:
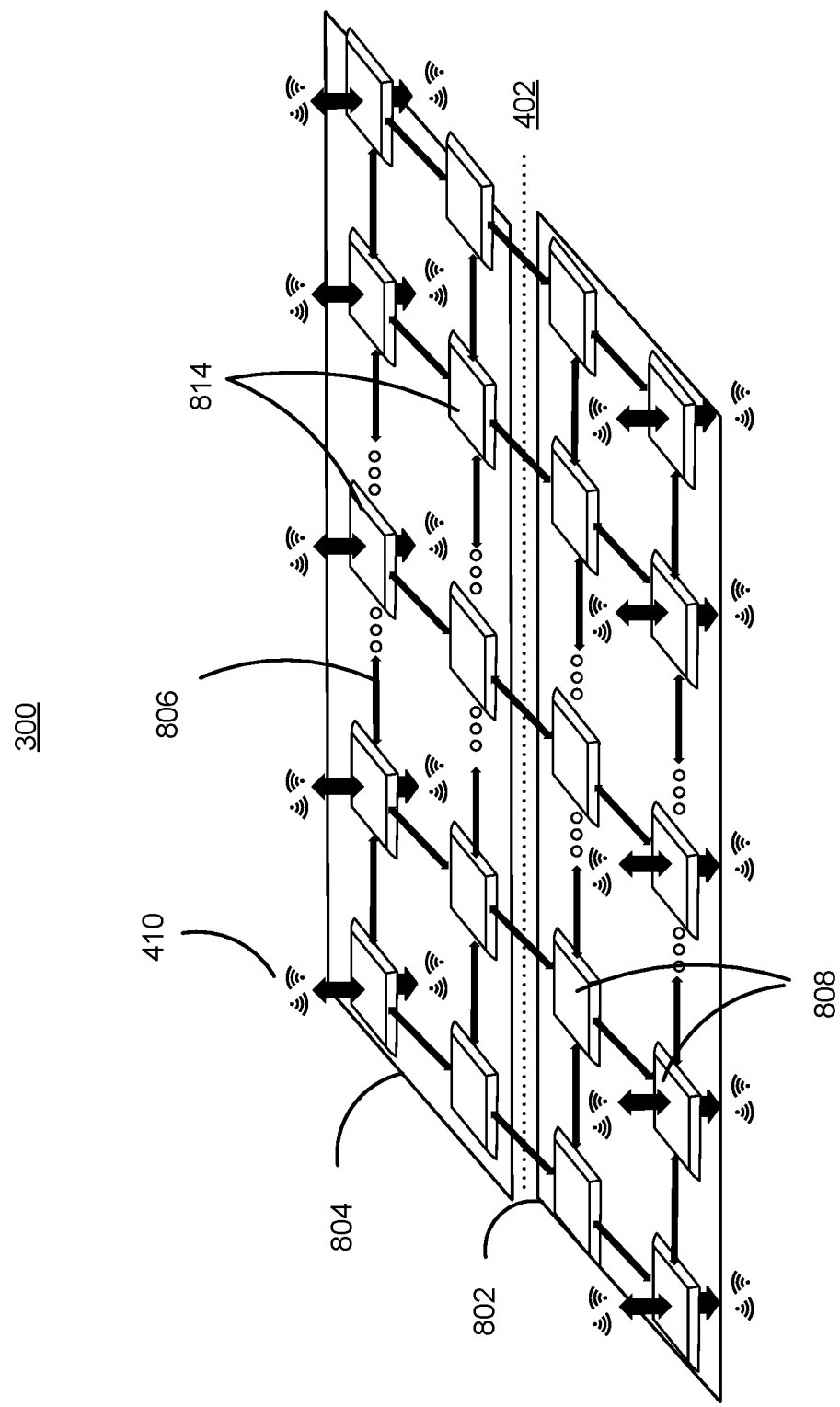
FIG. 8 shows communication paths in a rack mountable device, in accordance with some embodiments.

FIG. 8 shows a schematic diagram of communication paths in a server 300, in accordance with some embodiments. The communication paths provide for multi-box connectivity. The EHF communication devices 310 of a server 300 may be coupled to server-to-server communication components 802 and pass-through communication components 804 in the server 300 that route data between the EHF communication devices 310. Using the server-to-server communication components 802, a portion of the EHF communication devices 310 of the server 300 may be dedicated to server-to-server communications with adjacent servers 300, and using the pass-through communication components 804, another portion of the EHF communication devices 310 of the server 300 may be dedicated to pass through communications with more distant servers 300 (e.g., pass communication signals between servers that are not adjacent to each other). In other words, server-to-server communication components 802 are used for adjacent server-to-server communication in which packets are produced and consumed by the server and adjacent servers, while pass-through communication components 804 are used for pass-through communication between non-adjacent servers in the rack (e.g., packet originating from a server are not consumed by an adjacent server).

The server 300 includes server-to-server communication components 802 and pass through communication components 804. The server-to-server communication components 802 include server-to-server communication switch devices 808 that perform data routing between the EHF communication devices 310 (e.g., at top and bottom sides of the server 300) via link connections 806. Each server-to-server communication switch device 808 may be connected with a plurality of EHF communication devices 310, which are not shown in FIG. 8 to avoid overcomplicating the disclosure. The link connections 806 that interconnect server-to-server communication switch devices 808 may be wired connections, such as serial link connections.

The pass-through communication components 804 include pass-through communication switch devices 814 that perform data routing between the EHF communication devices via link connections 806. Each pass-through communication switch device 814 may be connected with one or more EHF communication devices 310, which are not shown in FIG. 8 to avoid overcomplicating the disclosure. The server-to-server communication switch devices 808 and the pass-through communication switch devices 814 are also connected, thus connecting the EHF communication devices 310 in the server 300. In some embodiments, the link connections 806 connect the switch devices 808 and 814 via the main board 402, such as through servers on the main board 402 that control the data routing. In some embodiments, each switch device 808/814 is a 4×4 switch IC chip. The switch devices 808/814 and link connections 806 may provide multiple paths between EHF communication devices such that data can be rerouted in the case of a defective link connection, switch device, EHF communication device, etc.

In some embodiments, the connector board 404 includes the switch devices 808/814. Data received by the server 300 may be routed to another (e.g., adjacent) server 106 without passing through the main board 402. With reference to FIG. 4, the server 106a may transmit data to the server 106c using the server 106b as a pass through. The server 106a sends data to the server 106b using its pass-through communication components, and the server 106b may route the data to the server 106c using its pass-through communication components. In some embodiments, the data being routed through one or more servers 106 being used as pass through is not routed through the main boards 402 of the devices 106 being used as pass through, or a component on these main boards 402. Instead, the data may be routed through switch devices 814 on the connector board 404 or some other component separate from the main board 402. Among other things, the speed of wireless data transfer across stacked servers 300 in the server rack 100 is improved.

In some embodiments, the switch devices 808/814 may be in other locations in the server 300. For example, the switch devices 808 or 814 may be on the main board 402, or on a circuit board with the EHF communication devices.

In some embodiment, a first group of switch devices 808 or 814 route data between EHF communication devices along the top and bottom sides of the server 300, another group of the switch devices 808 or 814 route data between other EHF communication devices of the server 300 and the main board of the server 300.

Figure 9:
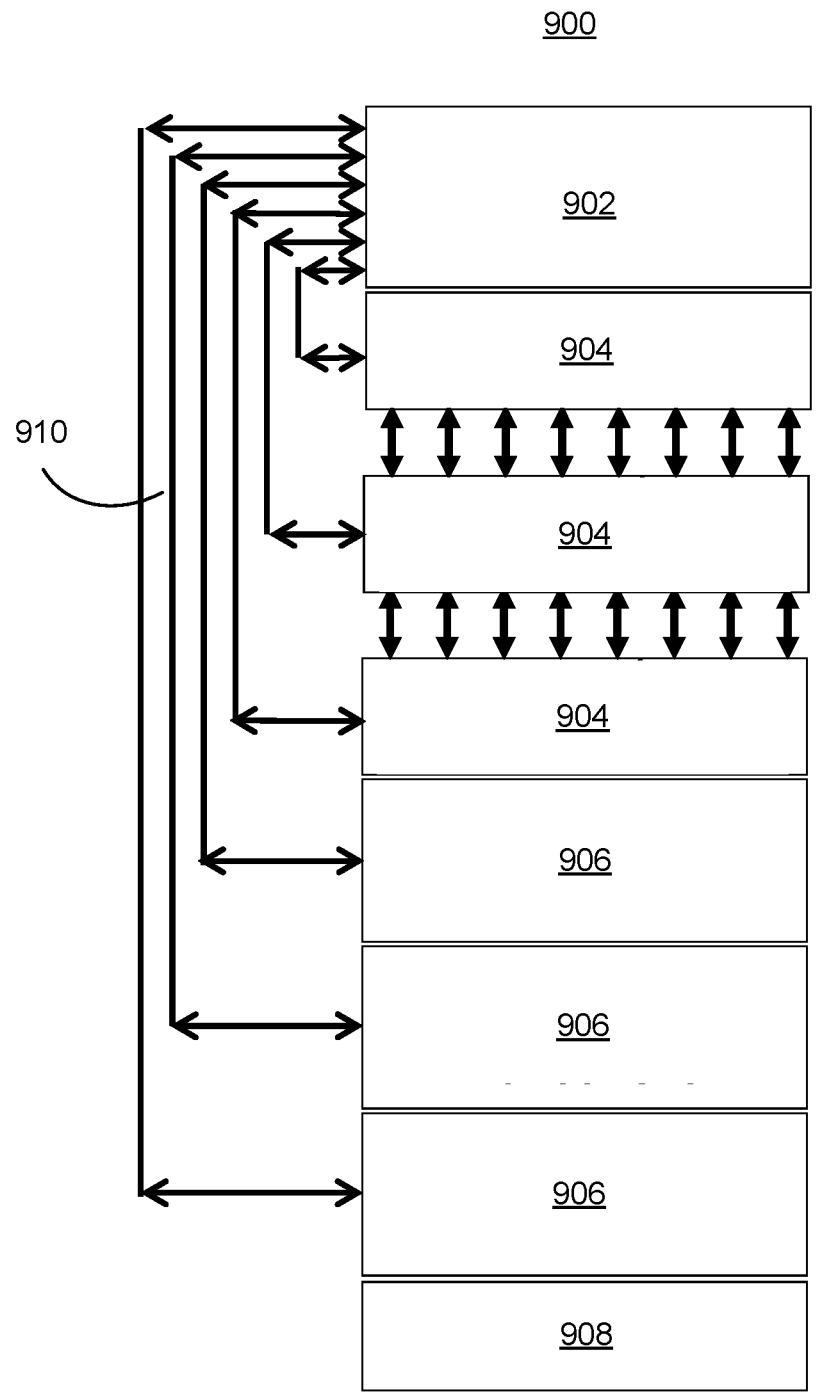
FIG. 9 shows rack mountable devices in a server rack, in accordance with some embodiments.

FIG. 9 shows servers in a server rack 900, in accordance with some embodiments. The server rack 900 is an example of a server rack 100 including a top-of-rack (TOR) switch 902, compute and memory servers 904, storage servers 906, and a power unit 908. The TOR switch 902 is at the top of the server rack 900, the compute and memory servers 904 are located under the TOR switch 902, the storage servers 906 are located under the compute and memory servers 904, and the power unit is located under the storage servers 906 at the bottom of the server rack 900.

The TOR switch 902 provides networking to the compute and memory servers 904 and the storage servers 906. The compute and memory servers 904 may include processing and memory components of various types. The storage servers 906 provide persistent storage resources, which may be functionally decoupled from the computing resources of the compute and memory servers 904. In some embodiments, the storage servers 906 are used to implement databases or backup storage. The storage servers 906 may also be located in a different chassis from the compute and memory servers 904. The power unit 908 provides power to the other components of the server rack 900, and may be connected to an external power source.

The compute and memory servers 904 wirelessly communicate with each other via EHF communication devices disposed at the top and/or bottom sides. The compute and memory servers 904 further include EHF communication devices at one or more sides that communicate with EHF communication devices in the rack frame 102 of the server rack 100. The rack frame includes wired communication channels 910 that carry data between the compute and memory servers 904 and the storage servers 906 and the TOR switch 902. A wired communication channel 910 may be formed from one or more conductive wires. In some embodiments, the storage servers 906 or TOR switch 902 includes EHF communication devices to wirelessly connect with the wired communication channels 910 via EHF communication devices in the rack frame 102. In other embodiments, the storage servers 906 or TOR switch 902 connect with the wired communication channels 910 using wired connections. In some embodiments, the wired communication channels 910 include Ethernet connections, such as 40 gigabits/second (G), 100G, or higher speed connections.

In some embodiments, the compute and memory servers 904 have a rack size of 3 rack units (U) and the storage servers 906 have a rack size of 8 U, and the power unit 908 has a rack size of 5 U. The rack frame 102 includes bays 104 that support these rack sizes. In some embodiments, the size of the bays 104 may be adjustable to allow different stacked configurations of the TOR switch 902, compute and memory servers 904, storage servers 906, and the power unit 908.

Figure 10:
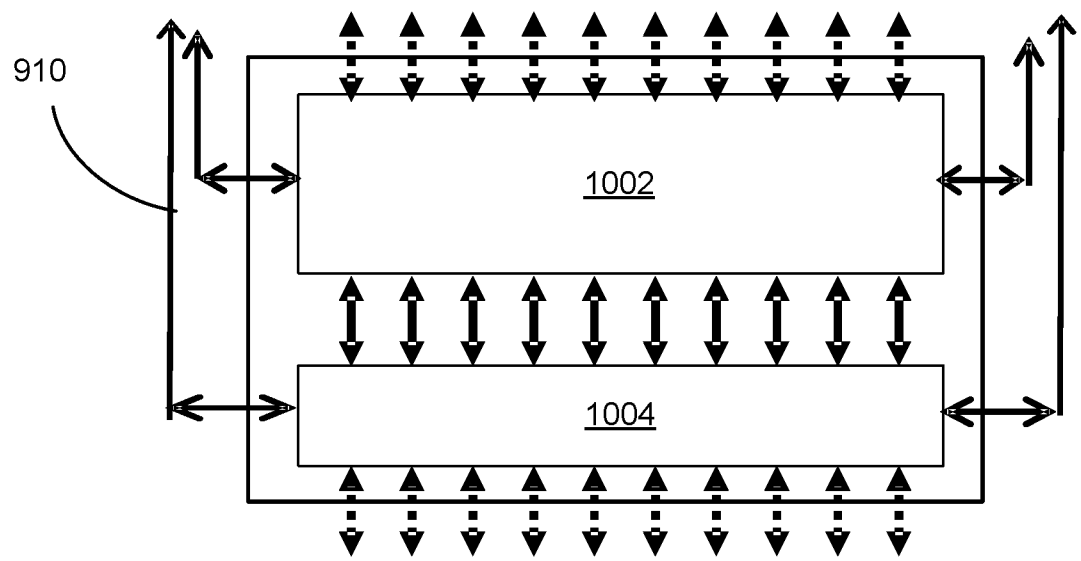
FIG. 10 shows a server rack mountable compute device in wireless communication with a rack mountable memory device, in accordance with some embodiments.

FIG. 10 shows a compute server 1002 in wireless communication with a memory server 1004, in accordance with some embodiments. The memory and computing resources of the compute and memory servers 904 shown in FIG. 9 may be functionally decoupled and located in separate chassis that are wirelessly connected using EHF communication devices. The compute server 1002 includes processors such as central processing units (CPUs), graphical processing units (GPUs), application-specific integrated circuits (ASICs), or field-programmable gate arrays (FPGAs). In some embodiments, the CPUs implements server applications and or other applications, while the GPUs, FPGAs, or ASICs operate as computing accelerators. The memory server 1004 includes memory that may be used by the processing resources of the compute server 1002, or some other processing resource in the server rack 100 or server rack system 200.

In various embodiments, EHF communication channels may be used to form connections between components in adjacent rack mountable chassis. The connected components may include CPU core to CPU core, CPU core to accelerator (e.g., GPU/FGPA/ASIC), accelerator to accelerator, CPU core to memory, or memory to memory.

With reference to FIG. 10, the server rack 900 may include the compute server 1002 in wireless communication with the memory server 1004 using EHF communication devices at interfacing top/bottom sides. The EHF communication devices provide a fast, high bandwidth top/bottom pipe between the processing resources in the compute server 1002 and the memory resources in the memory server 1004. The compute server 1002 and memory server 1004 may further include EHF communication devices along one or more sides to wirelessly communicate with the wired communication channels 910 via EHF communication devices in the rack frame 102. Each of the compute server 1002 and memory server 1004 may be connected to and communicate data with the TOR switch 902. The EHF communication devices at the sides provide a fast, high bandwidth side pipe between the processing resources in compute servers and decoupled memory resources in the memory servers.

In some embodiments, the compute server 1002 has a rack size of 2 U, and the memory server 1004 has a rack size of 1 U. As such, the compute server 1002 and the memory server 1004 have a combined rack size of 3 U, which is equivalent to the 3 U rack size of the compute and memory servers 904. Groups of a rack mountable compute device 1002 wirelessly coupled to a memory server 1004 as shown in FIG. 10 may be stacked on top of each other, and with adjacent groups communicating with each other at top and bottom sides using EHF communication devices, such as shown for the compute and memory servers 904 in FIG. 9.

Figure 11:
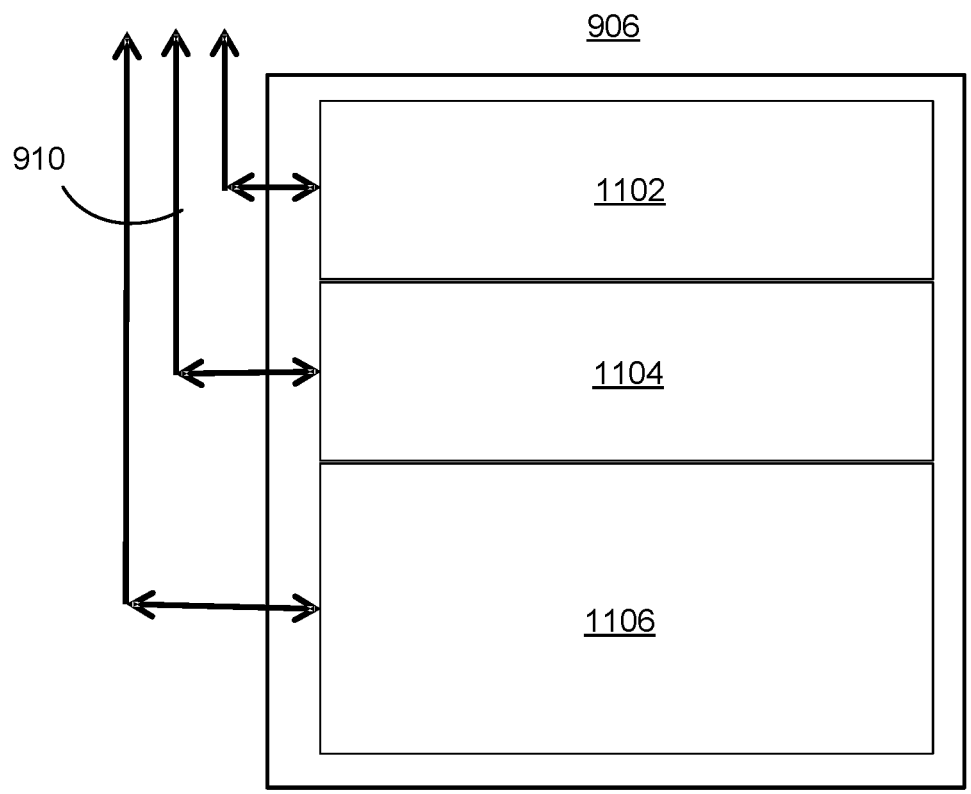
FIG. 11 shows a storage rack mountable device of a server rack, in accordance with some embodiments.

FIG. 11 shows a storage server 906, in accordance with some embodiments. The storage server 906 includes a hot storage device 1102, a standby storage device 1104, and a cold storage device 1106. The devices 1102, 1104, and 1106 may provide for redundancy and backup of data of primary systems. The hot storage device 1102 may store a backup system that receives frequent updates from a primary system, and may even include real-time updates to keep the primary and backup system synchronized. The standby storage device 1104 receives less frequent updates from the primary system than does the hot storage device 1102, providing a warm standby. The cold storage device 1106 receives even less frequent updates from the primary system, and executes when the primary system fails.

In some embodiments, the hot storage device 1102 has a rack size of 2 U, the standby storage device 1104 has a rack size of 2 U, and the cold storage device 1106 has a rack size of 4 U. As such, the hot storage device 1102, standby storage device 1104, cold storage device 1106 have a combined rack size of 8 U, which is equivalent to the 8 U rack size of the storage device 905. Groups of a hot storage device 1102, a standby storage device 1104, and a cold storage device 1106 as shown in FIG. 10 may be stacked on top of each other, with each of the hot storage device 1102, standby storage device 1104, cold storage device 1106 including EHF couplers at one or more side surfaces to wirelessly connect with the TOR switch 902 via the wired communication channels 910.

FIGS. 12A, 12B, 12C, 12D, 12E, and 12F show wireless communication architectures between processors and memories in a server rack 100, in accordance with some embodiments. The processors and memories of the server rack 100 may be connected using EHF communication devices 310. In some embodiments, the processors are in a first server 106 and the memory is in a second server 106 adjacent to the first server 106 in the server rack 100. In other embodiments the processors and memory are in a single server 106. Computing and memory resources in a server 106 may communicate wirelessly using EHF communication devices, as shown in greater detail in FIGS. 15A and 15B.

Figure 12A:
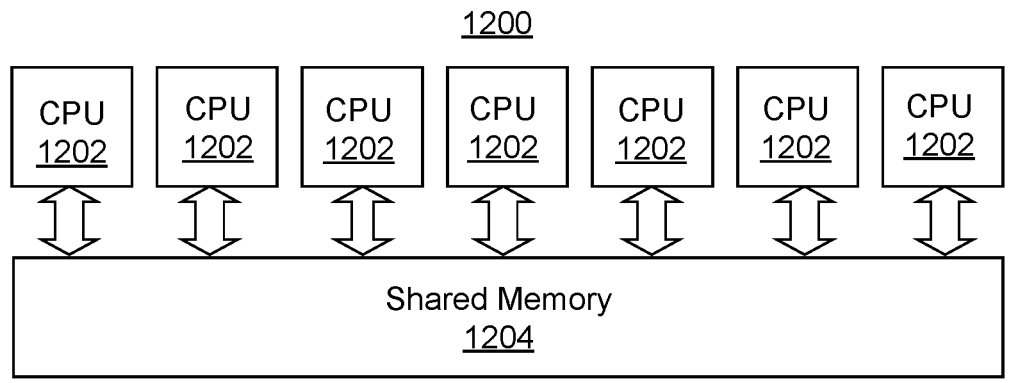
FIGS. 12A, 12B, 12C, 12D, 12E, and 12F show wireless communication architectures between processors and memories in a server rack, in accordance with some embodiments.

With reference to FIG. 12A, the wireless communication architecture 1200 includes separate central processing units (CPUs) 1202 wirelessly connected a shared memory 1204 via EHF electromagnetic communication connections formed using EHF communication devices 310. The shared memory 1204 may include uniform memory access (UMA) or symmetric multiprocessing (SMP) architectures.

Figure 12B:
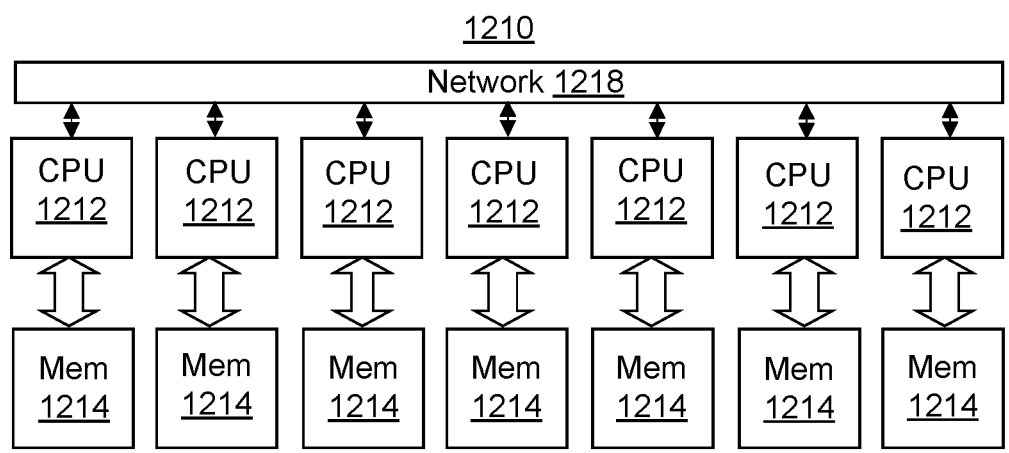

With reference to FIG. 12B, the wireless communication architecture 1210 includes CPUs 1212 each connected to a separate memory 1214 using EHF electromagnetic communication connections formed using EHF communication devices 310. Each CPU 1212 is further connected to a network 1218 using EHF communication channels formed with EHF communication devices 310, or using wired connections.

Figure 12C:
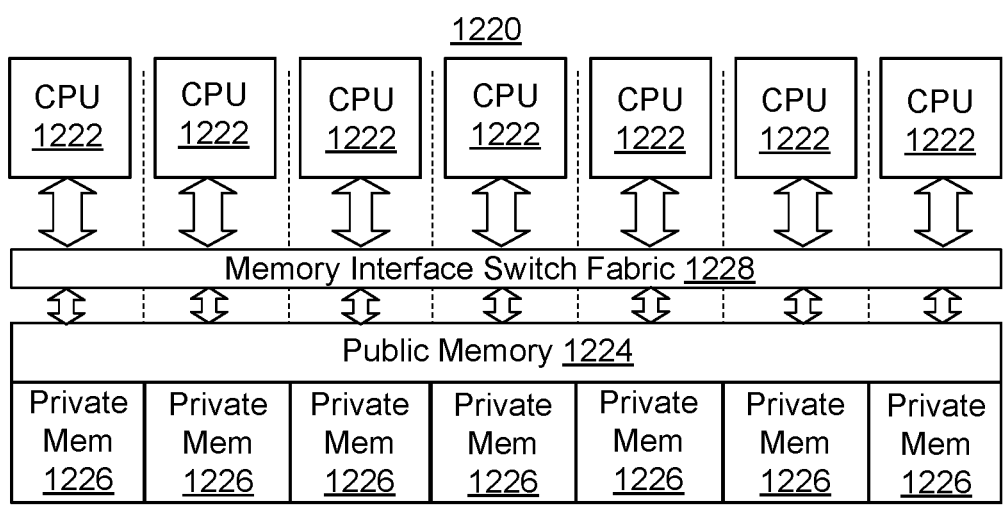

With reference to FIG. 12C, the wireless communication architecture 1220 includes CPUs 122 connected to a memory interface switch fabric 1228 using EHF electromagnetic communication connections formed using EHF communication devices 310. The memory interface switch fabric 1228 is connected with a public memory 1224, such as using wired connections or using EHF electromagnetic communication connections formed with EHF communication devices 310. The public memory is connected with private memories 1226, and provides an interface between the private memories 1226 and the CPUs 1222.

Figure 12D:
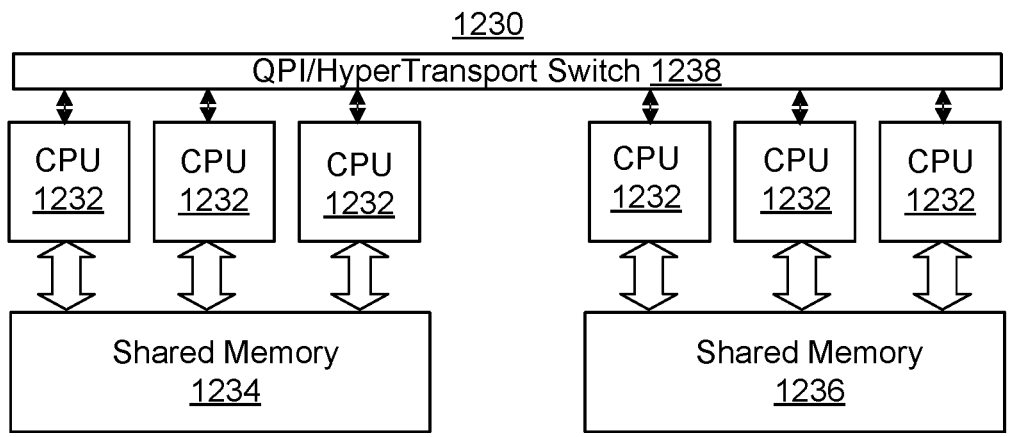

With reference to FIG. 12D, the wireless communication architecture 1230 includes separate central processing units (CPUs) 1232. A portion of the CPUs 1232 are wirelessly connected a shared memory 1234 via EHF electromagnetic communication connections formed with EHF communication devices 310, and another portion of the CPUs 1232 are wirelessly connected to a shared memory 1236 via EHF electromagnetic communication connections formed using EHF communication devices 310. Each CPU 1232 is further connected to a quick path interconnect (QPI)/HyperTransport switch 1238 using EHF electromagnetic communication channels formed with EHF communication devices 310, or using wired connections.

Figure 12E:
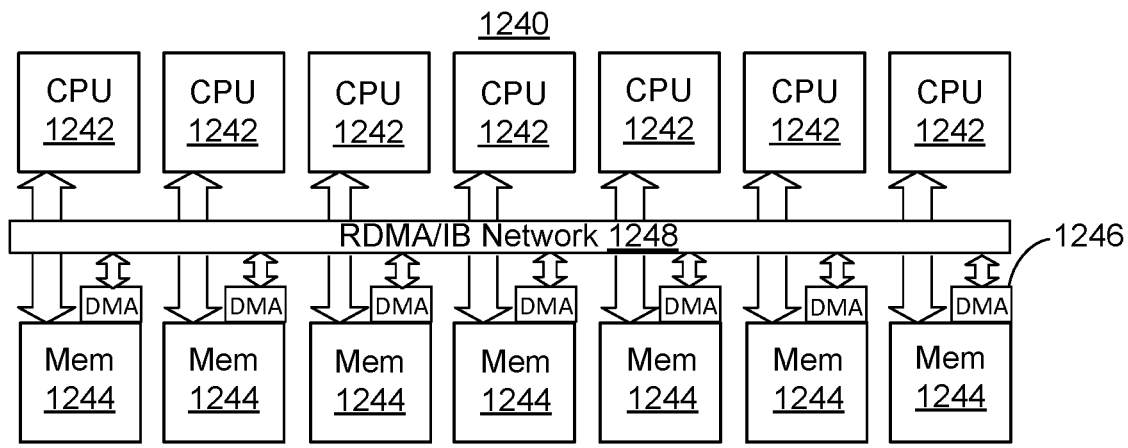

With reference to FIG. 12E, the wireless communication architecture 1240 includes CPUs 1242 each connected to an associated memory 1244 via EHF electromagnetic communication connections formed using EHF communication devices 310. Each memory 1244 has a direct memory access (DMA) unit 1246 connected to a remote direct memory access (RDMA)/Infiniband (IB) network 1248. In some embodiments, the DMA units 1246 communicate with the network 1248 via EHF electromagnetic communication connections formed using EHF communication devices 310. The CPUs 1242 may also be connected to the RDMA/IB network 1248 via the EHF communication channels allow remote access to each of memories 1244 independent of their associated CPUs 1242 (e.g., without consuming CPU processing or cache resources).

Figure 12F:
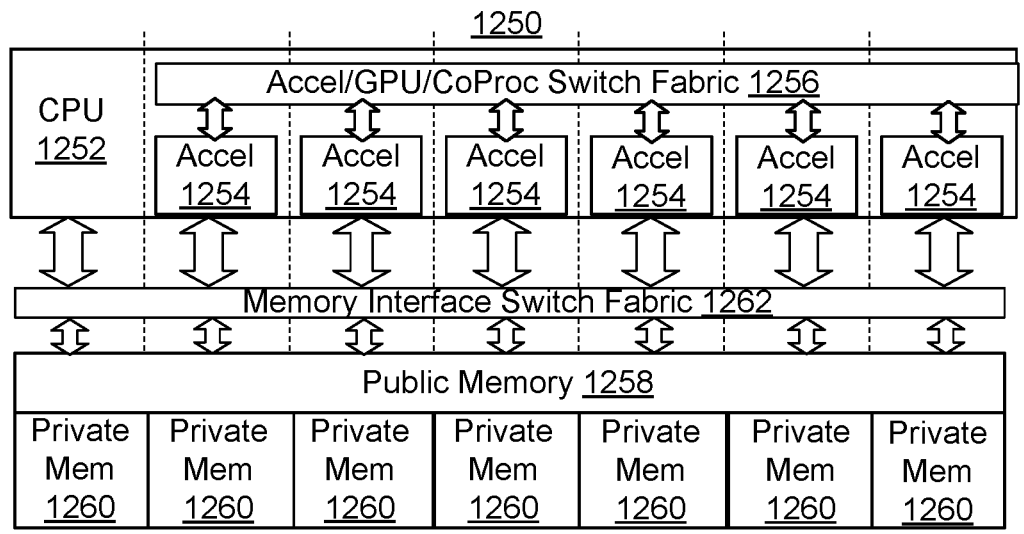

With reference to FIG. 12F, the wireless communication architecture 1250 includes a CPU 1252 connected with accelerators 1254 (e.g., GPUs) via an accelerator (Accel)/GPU/Coprocessor switch fabric 1256. The accelerators 1254 may be used to perform data processing tasks to accelerate workloads of the CPU 1252. The accelerators 1254 may be connected with the CPU 1252 via EHF electromagnetic communication connections formed using EHF communication devices 310, or via wired connections. The CPU 1252 and accelerators 1254 are each connected to a memory interface switch fabric 1262 via EHF electromagnetic communication connections formed using EHF communication devices 310. The public memory 1258 is connected to the memory interface switch fabric 1262, such via EHF electromagnetic communication connections or wired connections. The public memory 1258 is connected with private memories 1260, and provides an interface between the private memories 1260 and the CPUs 1252. In some embodiments, the CPU 1252, accelerators 1254, and switch fabric 1256 are in a first server and the switch fabric 1262, public memory 1258, and private memory 1260 are in a second server.

Server-to-Rack EHF Communication

Figure 13:
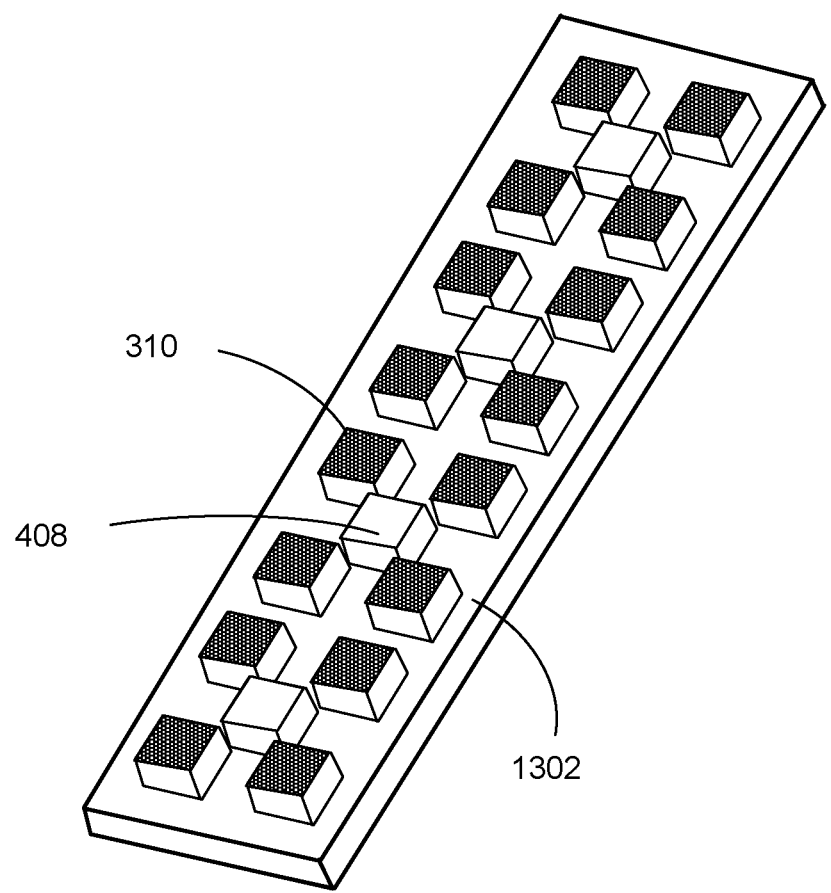
FIG. 13 shows a coupler strip, in accordance with some embodiments.

FIG. 13 shows a coupler strip 314 of a server 300, in accordance with some embodiments. The coupler strip 314 may provide server-to-rack EHF electromagnetic wireless communications. The coupler strip 314 may be similar to the coupler tile 312 but dimensioned to fit along sides 308 of the chassis 302. The EHF communication devices 310 of the coupler strip 314 may be dedicated for communications with the rack switch 108 via EHF communication devices 310 in the rack frame 102 of the server rack 100.

The coupler strip 314 includes a circuit board 1302, EHF communication devices 310, and aggregator devices 408. The circuit board 1302 provides electrical interconnections between the aggregator devices 408 and the EHF communication devices 310, as discussed above for the coupler tile 312. The discussion herein for the coupler tile 312 may be applicable to the coupler strip 314. For example, the coupler strip 314 may also include components that provide structural protection, waveguides, and wireless signal isolation such as the radiation absorbing shields 602, waveguides 604, and cover 606 shown in FIGS. 6A and 6B.

In some embodiments, the coupler strip 314 includes four aggregator devices 408, each facilitating data transfer for four EHF communication devices 310. The coupler strip 314 thus includes sixteen EHF communication devices 310. If each of the EHF communication devices 310 has a data rate of 6 Gigabits/second (Gbps), then the coupler strip 314 can have a read data rate of greater than 32 Gbps and a write data rate of greater than 32 Gbps. In another example, if each of the EHF communication devices 310 has data rate of 12 Gbps, then the coupler strip 314 can have a read data rate of greater than 64 Gbps and a write data rate of greater than 64 Gbps. In another example, if each of the EHF communication devices 310 has data rate of 28 Gbps, then the coupler strip 314 can have a read data rate of 1 greater than 28 Gbps and a write data rate of greater than 128 Gbps.

Figure 14:
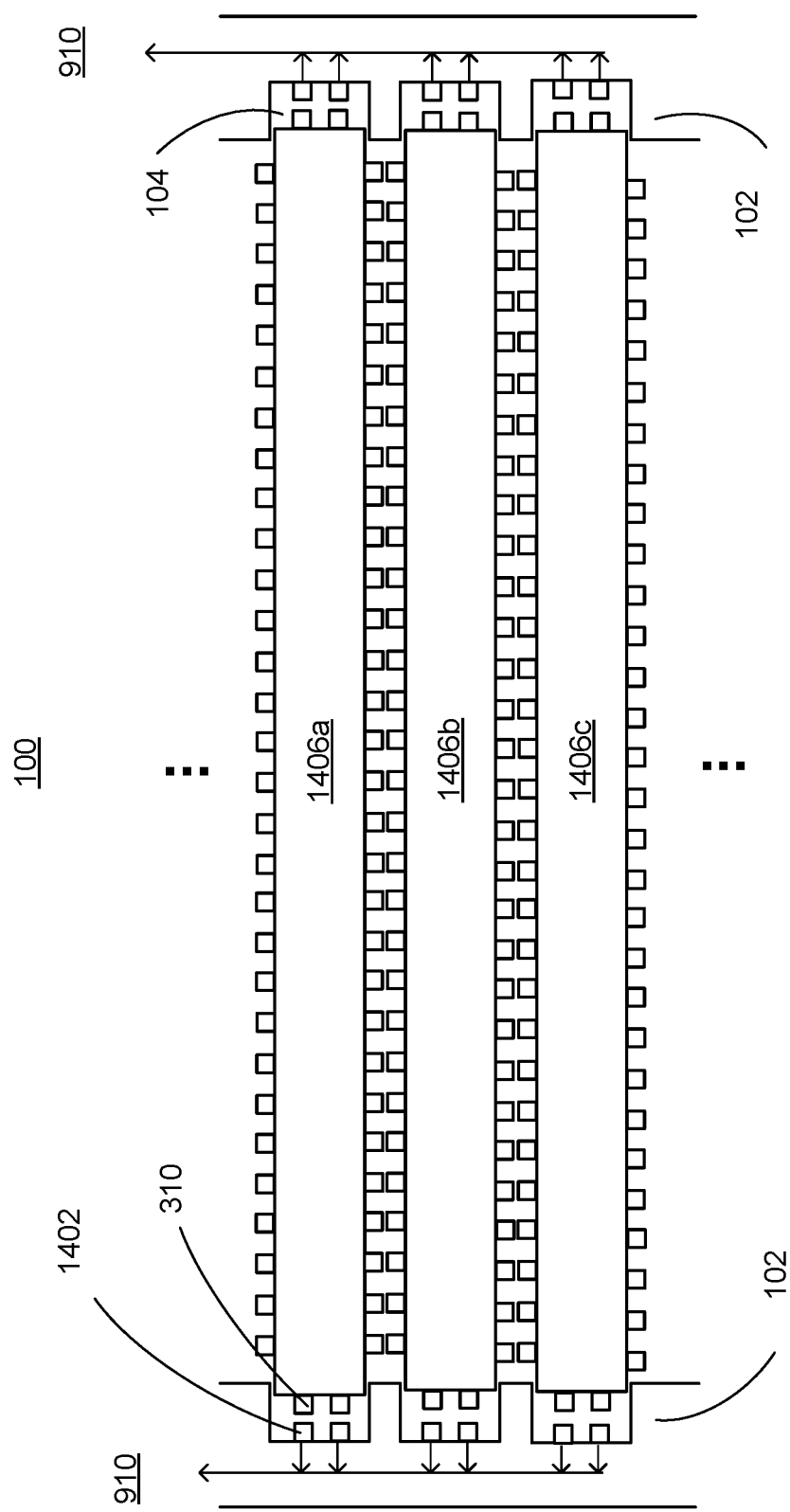
FIG. 14 shows wireless communication between EHF communication devices of a rack mountable device and EHF communication devices of the server rack, in accordance with some embodiments.

FIG. 14 shows wireless communication between EHF communication devices 310 of a server 1406 and EHF communication devices 1402 of the server rack 100, in accordance with some embodiments. As discussed above, the server rack 100 includes a rack frame 102 defining bays 104. Each of the servers 1406a, 1406b, and 1406c is inserted into a bay 104. Each of the EHF communication devices 310 at the side of the servers 1406 wirelessly communicates with an EHF communication device 1402 located at the side of the bay 104 using EHF electromagnetic signals. The EHF communication devices 1402 of the rack frame 102 are connected via the wired communication channel 910 to the rack switch 108 at the top of the server rack 100. The rack switch 108 may include wired connections to the wired communication channel 910. In some embodiments, the rack switch 108 also may include EHF communication devices, and the rack switch 108 communicates with the wired communication channel 910 using EHF electromagnetic signals. In some embodiments, the EHF communication devices 310 at the side of the servers 1406 and/or the EHF communication device 1402 located at the side of the bay 104 are formed in coupler strips 314.

In some embodiments, the server rack 100 does not include a back panel or associated cabling, thus increasing air flow in the server rack 100 and reducing component costs.

EHF Communication within a Server

Figure 15A:
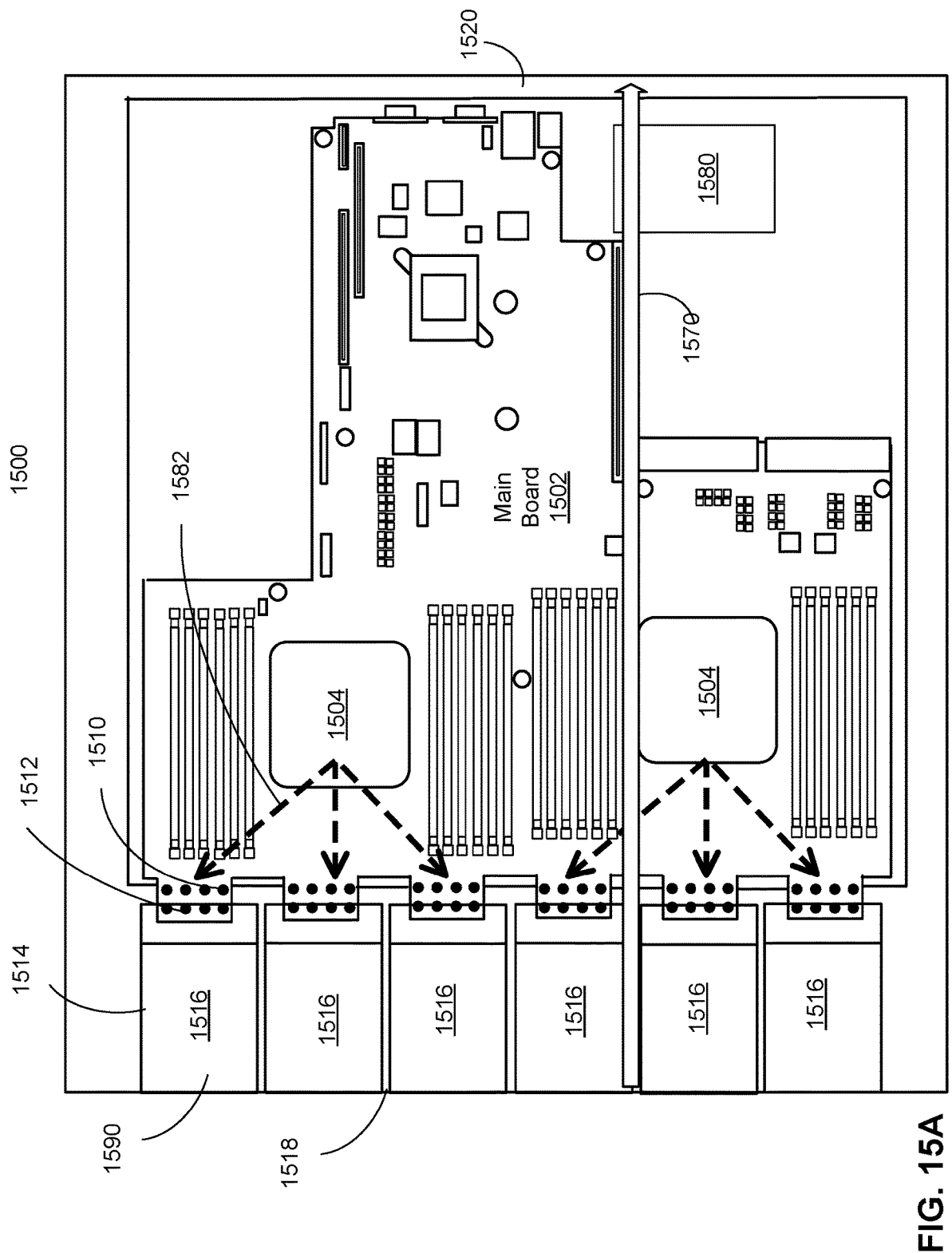
FIG. 15A shows EHF communication devices providing communication between a processor and memory in a rack mountable device, in accordance with some embodiments.
Figure 15B:
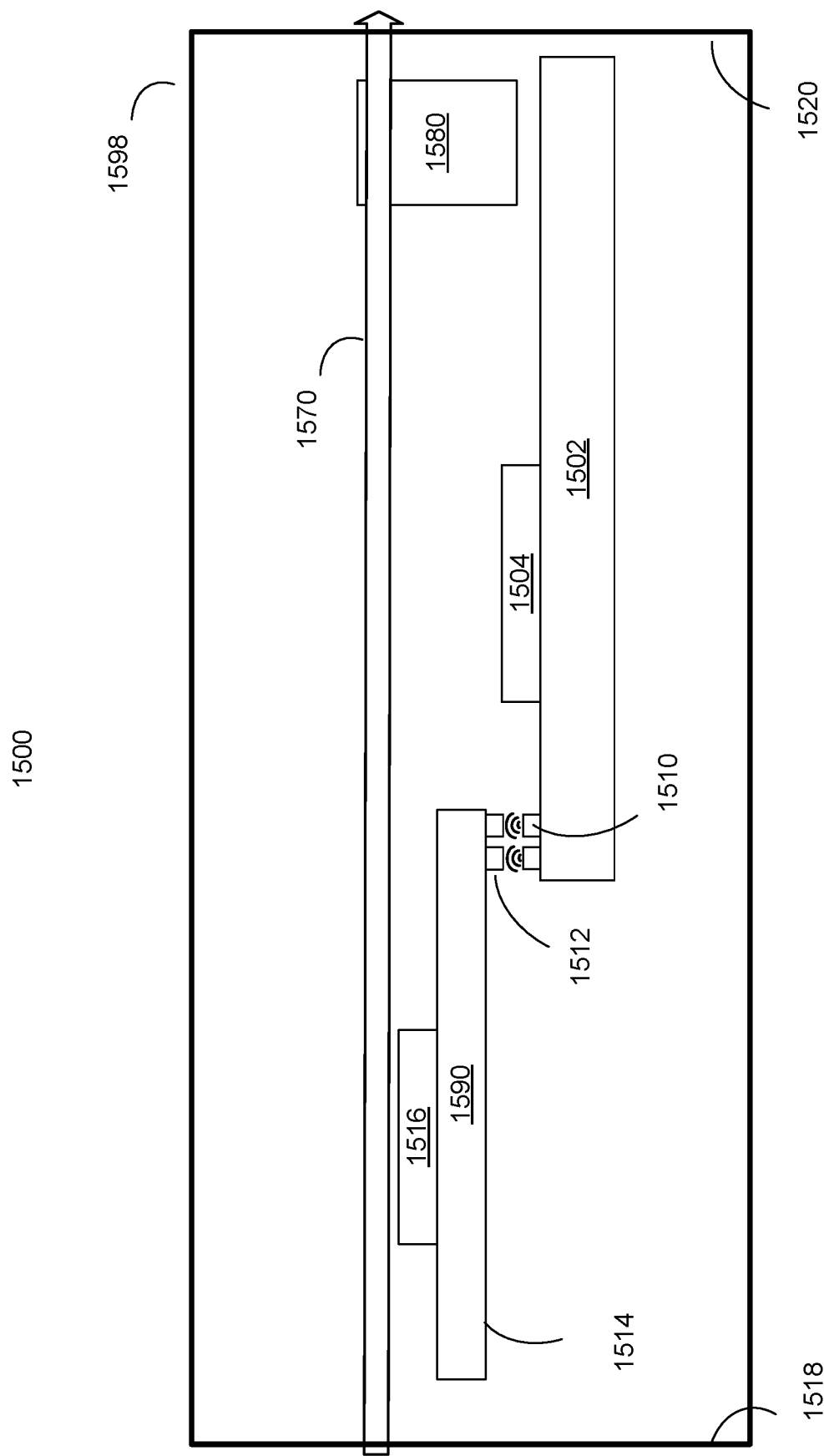
FIG. 15B shows a side view of the EHF communication devices providing communication between the processor and the memory in the rack mountable device, in accordance with some embodiments.

FIGS. 15A and 15B, respectively, show top and side views of EHF communication devices 1510 providing communication between processors 1504 and data storage drives 1514 in a server 1500, in accordance with some embodiments. The server 1500 is an example of a server 106, and may also use EHF communication devices for external data communication.

The server 1500 includes a main board 1502 that communicates with one or more data storage drives 1514 using EHF electromagnetic signals. The main board 1502 includes, among other things, one or more processors such as CPUs 1504, and EHF communication devices 1510. The main board 1502 connects the CPUs 1504 to the EHF communication devices 1510 via buses 1582. The CPU is an example of an electronic IC device.

Each data storage drive 1514 includes one or more non-volatile storage and memory elements 1516 and EHF communication devices 1512. Each data storage drive 1514 also includes a peripheral board 1590 that connects the memory element 1516 to the EHF communication devices 1512. Each EHF communication device 1512 forms an EHF electromagnetic communication channel with an EHF communication device 1510 using EHF electromagnetic signals. The EHF communication devices 1510 and 1512 connect the memory element 1516 and the CPU 1504 and allow the CPU to access data from the memory element 1516. The CPU 1504 may read data from and/or write data to the memory element 1516 via the buses 1582 and EHF electromagnetic communication channels. In some embodiments, the EHF communication devices 1510 and/or 1512 may be formed on coupler strips 314 or coupler tiles 312, and/or may incorporate additional components such as the radiation absorbing shields 602, lenses 604, and the cover 606 as shown in FIGS. 6A and 6B. In some embodiments, the EHF communication devices 1510 are mounted directly on the main board 1502, or the EHF communication devices 1512 are mounted directly on the peripheral board 1590.

One or more fans 1580 move air 1570 from the front side 1518 of the chassis to the back side 1520 of the chassis, or may otherwise move air through the interior of the chassis. The air 1570 is drawn across the data storage drives 1514 and across the main board 1502 and its components. The airflow cools the devices within the computing device and can provide better cooling when the restrictions in the airflow path are reduced. The fans 1580 may be located close to either the front side 1518 or back side 1520 of the chassis. The front side 1518 and the rear side 1520 of the chassis may be formed from cover panels with openings that allow the air to flow through the cover panels.

In some embodiments, the memory element 1516 includes non-volatile memory circuits and non-volatile main memory (e.g., persistent DRAMs (NVDIMM-P)) that store data in a persistent manner. The memory element 1516 may use the NVM Express (NVMe) interface specification for peripheral component interconnect PCI Express (PCIe). However, rather than being connected by PCIe slots on the main board 1502, or by a cable connected to a riser card (e.g., riser cards may block airflow and thick cables for PCI express can be difficult to manage) inserted into the PCIe slots on the main board 1502, the memory element 1516 may be connected to the main board 1502 via the EHF electromagnetic communication channels formed by the EHF communication devices 1510 and 1512. The main board 1502 may include one or more buses 1582 that electrically connect the CPU 1504 to the EHF communication devices 1510. In some embodiments, the bus 1582 is a peripheral component interconnect (PCIe) express bus. The EHF electromagnetic channels provide wireless NVMe communication. Among other things, use of PCIe cables can be eliminated to simplify cable management in the server, which reduces blocking of airflow in the server.

In some embodiments, each data storage drive 1514 includes four memory devices 1516, and six data storage drives 1514 are connected to the main board 1502. Thus, each server 1500 includes twenty-four memory devices 1516. The main board 1502 includes two processors 1504, with the EHF electromagnetic communication channels connecting each of the processors 1504 to the data storage drives 1514.

In some embodiments, the data storage drives 1514 are at the front area of the server 1500 that is closer to the front side 1518 than the back side 1520. The main board 1502 is at the back area of the server 1500 between the data storage drives 1514 and the back side 1520. The data storage drives 1514 may be mounted by sliding into the chassis 1598. This allows efficient access to the data storage drives 1514 from the front side of the server rack 100 for maintenance tasks.

Server Management

Figure 16:
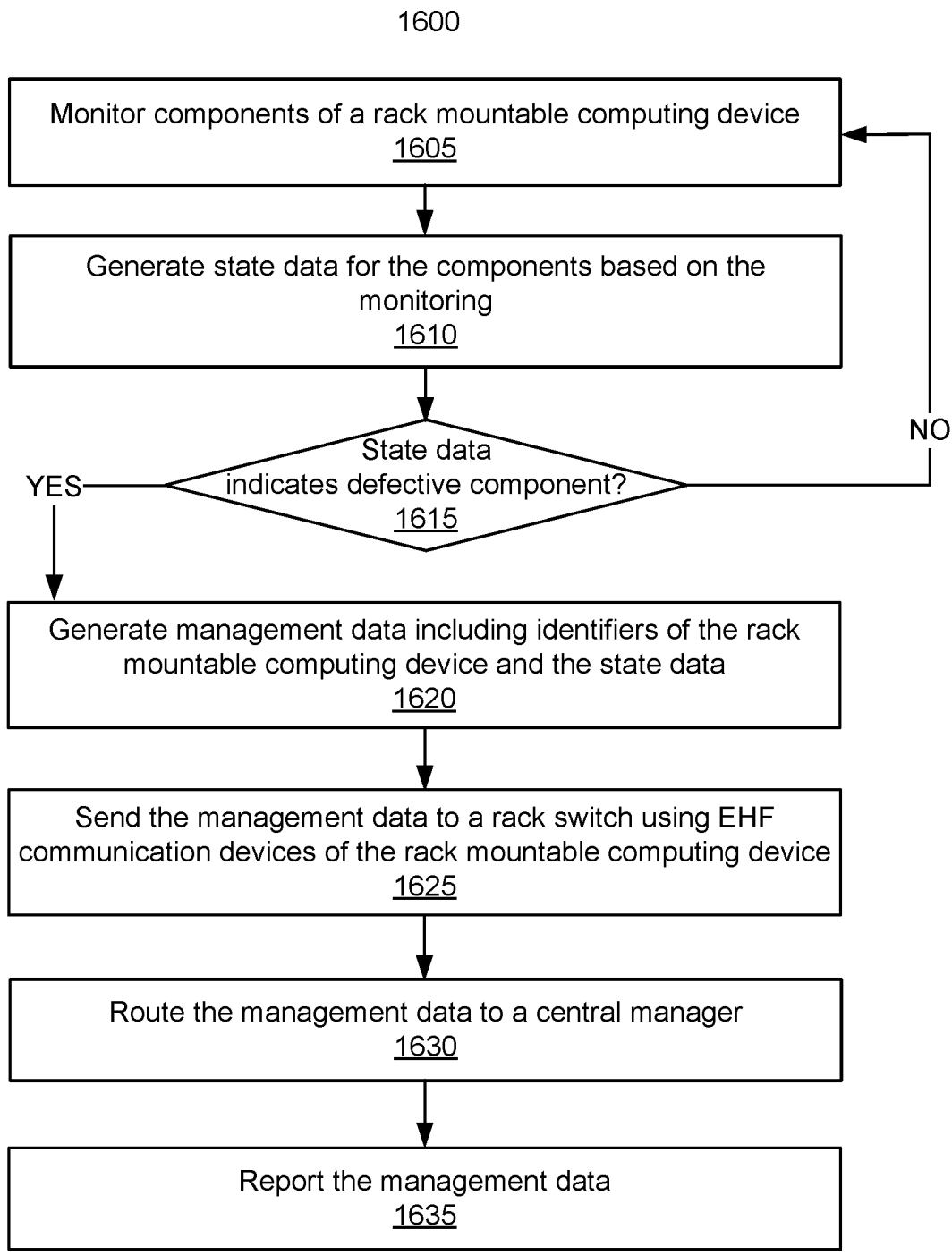
FIG. 16 shows a flow chart of a process for managing rack mountable devices, in accordance with some embodiments.

FIG. 16 shows a flow chart of a process 1600 for managing servers, in accordance with some embodiments. A portion of the EHF communication devices in the server may be used to facilitate management of the server. For example, EHF communication devices at the side of the server may be used to communicate management data to a central manager via the rack switch 108. In some embodiments, the EHF communication devices provide a dedicated management channel for communication of the management data that remains operational even when other components become defective.

A device management sub-system in the server monitors components of the server (at 1605). The management sub-system may include a management processor in the server that executes an agent application. The monitored components may include hardware components such as processors, memory, switches, aggregators, EHF communication devices, boards, etc. In some embodiments, monitoring the components may include monitoring states of software executing on the components such as servers, applications, services, containers, virtual machines, operating systems, etc. The agent application may monitor the functionality of the components, such as the performance of the components. For example, the management sub-system may include sensors that monitor hardware components for components that are unpowered, unresponsive to network requests, providing slow processing or data transfer rates, operating at abnormal temperatures, or otherwise functioning improperly.

In some embodiments, the server includes sensors to monitor the components of the server. For example, the server may include a temperature sensor, an air flow sensor, etc.

The management sub-system generates state data for the components based on the monitoring of the components of the server (at 1610). The state data indicates the states of the components as determined from the monitoring.

The management sub-system determines whether the state data indicates a defective component (at 1615). For example, the states of the components may be compared with thresholds, and a defective component may be determined upon satisfaction of a threshold. In another example, the state data may indicate that a particular component is not operating, and thus may need repair or replacement.

In response to determining that the state data indicates a defective component in the server, the management sub-system generates management data including the state data and one or more identifiers of the server (at 1620). For example, the management data may include a server rack value that identifies the server rack 100 of the server rack system 200 in which the server is located, and a device value that identifies the location of the server in the server rack 100. The management sub-system may store the server rack value and the device value, such as in a memory of the server, and may retrieve these values when generating the management data. In some embodiments, the management data further includes the state data used to identify the defective component. The state data may provide an indication of the nature of the defect to facilitate appropriate remedial action. In some embodiments, a light emitting diode (LED) service indicator on the chassis of the server is activated in response to determining a defective component to facilitate visual identification.

The management sub-system sends the management data to a rack switch using a portion of the EHF communication devices of the server (at 1625). With reference to FIG. 14, the management sub-system sends the management data using one or more of the EHF communication devices 310 at a side surface of the server 1406. The management data is wirelessly transmitted to EHF communication devices 1402 in the rack frame 102, and then transmitted to the rack switch via the wired communication channel 910.

The rack switch routes the management data to a central manager (at 1630). The central manager may be an application executing on a processor of another server in the server rack 100. Here, EHF communication devices may also be used to transmit the management data from the rack switch to the server executing the central manager. In other embodiments, the central manager executes in a server of another server rack 100 of the server rack system 200. The rack switch may transmit the management data to the server in the other server rack 100 via the spine router 202, the rack switch of the other server rack, and then from the rack switch of the other server rack to the other server using EHF communication devices. In other embodiments, central manager is on a device remote from the server rack system 200, and the management data is routed through the server rack system 200 accordingly by the rack switch and spine router 202. In some embodiments, the rack switch includes a processor that executes the central manager.

In some embodiments, EHF communication devices provide a dedicated management channel for communication between the management sub-system and the central manager. This dedicated management channel may be separate from other communication paths. Such other communication paths may include communication paths involving other EHF communication devices that are not dedicated to the management channel (e.g., shown in FIG. 8), and may further include other communication paths such as those without EHF communication devices (e.g., wired data connections). The dedicated management channel may use hardware components separate from the other communication paths such that the dedicated management channel may remain operational even when other components become defective.

The central manager reports the management data (at 1635) and may be a software program. For example, the central manager may be used by an administrator of the server rack system 200 to manage the servers and their components in each of the server racks 100. The management data can be reported in various ways. The central manager may generate a user interface that indicates the server rack value and the device value of the server including the defective component. In another example, the central manager sends a notification (e.g., application message, text message, email, etc.) including the management data to another device of the administrator. The server rack value and the device value may be associated with known locations in the server rack system 200. The reporting allows the server to be located by the administrator for maintenance, repair or replacement.

In some embodiments, the central manager provides for communication with the server including the defective component using the dedicated management channel through EHF communication devices. For example, the central manager may query the management sub-system or other component (e.g., server) in the server via the dedicated management channel, or perform remote testing or software repair via the dedicated management channel.

Figure 17:
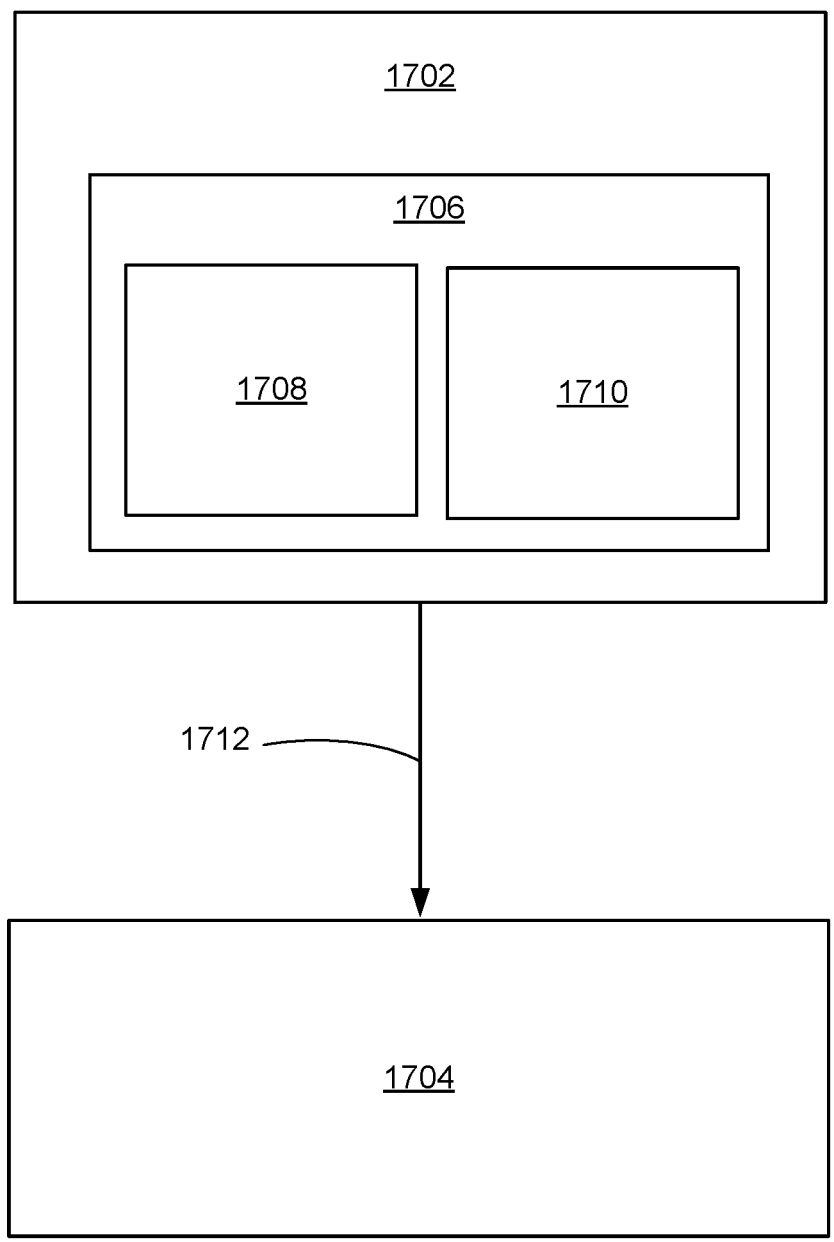
FIG. 17 shows a management system for a rack mountable device, in accordance with some embodiments.

FIG. 17 shows a management system 1700 for a server, in accordance with some embodiments. The system 1700 includes a server 1702 that is being monitored by a central manager 1704. The server 702 includes a management sub-system 1706 including a management processor 1708 and sensors 1710. As discussed in greater detail above in connection with FIG. 16, the management processor 1708 uses the sensors 1710 to generate the management data describing one or more states of a monitored server 1702, and sends the management data to the central manager 1704. The sensors 1708 may include environmental sensors or software sensors that monitor the states of servers or applications. For example, the sensors 1708 may include sensors for temperature, parity check for memories, memory scrubbing results, SMART hard drive data, memory usage (volatile and non-volatile), processor usage, I/O bandwidth utilization, users on a server, I/O activity, component health status, NVMe wear data, NVMe error data, power consumption, air flow, humidity, etc. In some embodiments, the management processor 1708 is a processor on the main board 402 of the server 1702. In other embodiments, the management processor 1708 is separate from processors of the main board. For example, the management processor 1708 may be on the connector board 404 of the server 1702.

The central manager 1704 may be implemented by one or more processors separate from the server 1702. For example, the central manager 1704 may be in another server in the same server rack as the management sub-system 1706, or may be in another server rack of the same server rack system, or may be in a different computing device. The management sub-system 1706 and the central manager 1704 communicate via one or more sets of EHF electromagnetic communication channels 1712 formed from paired sets of EHF communication devices as discussed herein.

Additional Configuration Information

The foregoing description of the embodiments has been presented for the purpose of illustration; it is not intended to be exhaustive or to limit the patent rights to the precise forms disclosed. Persons skilled in the relevant art would appreciate that many modifications and variations are possible in light of the above disclosure.

The scope of the patent rights is not limited by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
   a rack mountable device comprising:
      a rack mountable chassis including a first side;
      a first circuit board having a first surface that extends along the first side of the rack mountable chassis;
      a first extremely high frequency (EHF) communication device attached to the first surface of the first circuit board, the first EHF communication device configured to convert between a first EHF electromagnetic signal and a first electrical data signal;
      a second EHF communication device attached to the first surface of the first circuit board, the second EHF communication device configured to convert between a second EHF electromagnetic signal and a second electrical data signal;
      a first radiation absorbing shield surrounding the first EHF communication device and not surrounding the second EHF communication device to shield the first EHF communication device from the second EHF electromagnetic signal emitted from or received by the second EHF communication device; and a second radiation absorbing shield surrounding the second EHF communication device and not surrounding the first EHF communication device to shield the second EHF communication device from the first EHF electromagnetic signal emitted from or received by the first EHF communication device.

2. The system of claim 1, wherein the rack mountable chassis includes a cover panel at the first side of the rack mountable chassis, the cover panel including an opening for transmitting the first EHF electromagnetic signal.

3. The system of claim 1, wherein the rack mountable chassis includes a cover panel at the first side of the rack mountable chassis, wherein the first circuit board is parallel to the cover panel and the first EHF communication device is aligned with an opening in the cover panel.

4. The system of claim 1, wherein the rack mountable device further comprises:
a main board in the rack mountable chassis and having a connector;
a connector board inserted into the connector; and
a cable connecting the connector board to the first circuit board,
wherein data from the main board is provided to the first EHF communication device via the connector board and the cable.

5. The system of claim 1, wherein the rack mountable device comprises:
a plurality of first EHF communication devices including the first EHF communication device and the second EHF communication device attached to the first surface of the first circuit board; and
a data aggregator device attached to the first circuit board, the data aggregator device configured to:
receive electrical data signals from each first EHF communication device, the electrical data signals including the first and second electrical data signals, each electrical data signal including first data at a first data rate;
generate second data at a second data rate by combining the first data outputted from the first EHF communication devices; and
output the second data.

6. The system of claim 1, wherein the rack mountable device further includes a waveguide extending from the first EHF communication device into an opening at the first side of the rack mountable chassis.

7. The system of claim 1, wherein the first EHF communication device includes:
an integrated circuit;
an antenna coupled to the integrated circuit; and
an encapsulating material over the integrated circuit and the antenna.

8. The system of claim 1, wherein the rack mountable chassis includes a second side opposite the first side and the rack mountable device further includes:
a second circuit board having a second surface that extends along the second side; and
a third EHF communication device attached to the second surface of the second circuit board, the third EHF communication device configured to convert between a third EHF electromagnetic signal and a third electrical data signal.

9. The system of claim 8, wherein the rack mountable chassis includes a third side between the first and second sides, and wherein the rack mountable device further includes:
a third circuit board having a third surface that extends along the third side; and
a fourth EHF communication device attached to the third surface of the third circuit board, the fourth EHF communication device configured to convert between a fourth EHF electromagnetic signal and a fourth electrical data signal.

10. The system of claim 8, wherein the rack mountable device further includes:
a plurality of first EHF communication devices including the first and second EHF communication devices attached to the first surface of the first circuit board;
a plurality of third EHF communication devices attached to the second surface of the second circuit board;
a main board in the rack mountable chassis;
a first switch configured to route data between a subset of the first EHF communication devices and a subset of the third EHF communication devices; and
a second switch configured to route data between another subset of the first EHF communication devices and the main board.

11. The system of claim 1, wherein the rack mountable device corresponds to a server.

12. A system, comprising:
a rack frame including a first bay and a second bay;
a first rack mountable device in the first bay, comprising:
a first rack mountable chassis including a first side;
a first extremely high frequency (EHF) communication device disposed along the first side, the first EHF communication device configured to emit or receive a first EHF electromagnetic signal;
a second EHF communication device disposed along the first side of the first rack mountable chassis, the second EHF communication device configured to emit or receive a second EHF electromagnetic signal;
a first radiation absorbing shield surrounding the first EHF communication device and not surrounding the second EHF communication device to shield the first EHF communication device from the second EHF electromagnetic signal; and
a second radiation absorbing shield surrounding the second EHF communication device and not surrounding the first EHF communication device to shield the second EHF communication device from the first EHF electromagnetic signal; and
a second rack mountable device in the second bay, comprising:
a second rack mountable chassis including a second side facing the first side of the first rack mountable chassis; and
a third EHF communication device disposed along the second side of the second rack mountable chassis,
wherein the first EHF communication device is configured to form an EHF electromagnetic communication channel with the third EHF communication device to transfer data between the first rack mountable device and the third rack mountable device.

13. The system of claim 12, wherein the first rack mountable device includes:

a first circuit board having a first surface on which the first EHF communication device is attached, the first surface extending along the first side of the first rack mountable chassis; and a cover panel at the first side of the first rack mountable chassis, the cover panel including an opening.

14. The system of claim 12, wherein the first rack mountable device includes:

a first circuit board having a first surface on which the first EHF communication device is attached, the first surface extending along the first side of the first rack mountable chassis; and a cover panel at the first side of the first rack mountable chassis, wherein the first circuit board is parallel to the cover panel and the first EHF communication device is aligned with an opening in the cover panel.

15. The system of claim 12, wherein the first rack mountable chassis includes a second side opposite the first side of the first rack mountable chassis:

the first rack mountable device further includes a fourth EHF communication device disposed along the second side of the first rack mountable chassis;

the rack frame includes a third bay, the first bay disposed between the second bay and the third bay; and the system further includes a third rack mountable device in the third bay of the rack frame, the third rack mountable device comprising:

a third rack mountable chassis including a first side facing the second side of the first rack mountable chassis; and a fifth EHF communication device disposed along the first side of the third rack mountable chassis; and the fourth EHF communication device is configured to form another EHF electromagnetic communication channel with the fifth EHF communication device to transfer data between the first rack mountable device and the third rack mountable device.

16. The system of claim 15, wherein:

the first rack mountable device comprises a plurality of first EHF communication devices including the first and second EHF communication devices and a plurality of fourth EHF communication devices; and the first rack mountable device includes:

a main board in the first rack mountable chassis;

a first switch configured to route data between a subset of the first EHF communication devices and a subset of the fourth EHF communication devices; and a second switch configured to route data between another subset of the first EHF communication devices and the main board.

17. The system of claim 12, wherein:

the first rack mountable device comprises a plurality of first EHF communication devices including the first and second EHF communication devices; and the first rack mountable device includes a main board and a data aggregator device connecting the main board and the first EHF communication devices, the data aggregator device configured to:

receive electrical data signals from each first EHF communication device, each electrical data signal including first data at a first data rate;

generate second data at a second rate by combining the first data outputted from the first EHF communication devices; and output the second data.

18. The system of claim 12, wherein the first rack mountable device further includes a waveguide extending from the first EHF communication device into an opening at the first side of the first rack mountable device.

19. The system of claim 12, wherein the first EHF communication device includes:

an integrated circuit;

an antenna connected to the integrated circuit; and an encapsulating material over the integrated circuit and the antenna.

20. A computing device, comprising:

a chassis including a first side;

a circuit board having a surface that extends along the first side of the chassis;

a first extremely high frequency (EHF) communication device attached to the surface of the circuit board, the first EHF communication device configured to convert between a first EHF electromagnetic signal and a first electrical data signal;

a second EHF communication device attached to the surface of the circuit board, the second EHF communication configured to convert between a second EHF electromagnetic signal and a second electrical data signal;

a first radiation absorbing shield surrounding the first EHF communication device and not surrounding the second EHF communication device to shield the first EHF communication device from the second EHF electromagnetic signal emitted from or received by the second EHF communication device; and a second radiation absorbing shield surrounding the second EHF communication device and not surrounding the first EHF communication device to shield the second EHF communication device from the first EHF electromagnetic signal emitted from or received by the first EHF communication device.

* * * * *